(12) United States Patent
Barnett et al.

(10) Patent No.: US 7,849,117 B2
(45) Date of Patent: Dec. 7, 2010

(54) MULTI-TERM FREQUENCY ANALYSIS

(75) Inventors: Phillip W. Barnett, Highland Park, IL (US); Ashley M. Brook, Conshohocken, PA (US); Joseph Wyse, Malvern, PA (US)

(73) Assignee: Knowledge Sphere, Inc., Cleveland, OH (US)

(*) Notice: Subject to any disclaimer, the term of this patent is extended or adjusted under 35 U.S.C. 154(b) by 2315 days.

(21) Appl. No.: 09/759,498

(22) Filed: Jan. 12, 2001

(65) Prior Publication Data

US 2002/0082778 A1   Jun. 27, 2002

Related U.S. Application Data

(60) Provisional application No. 60/175,705, filed on Jan. 12, 2000, provisional application No. 60/176,935, filed on Jan. 18, 2000, provisional application No. 60/180,974, filed on Feb. 8, 2000, provisional application No. 60/186,720, filed on Mar. 3, 2000, provisional application No. 60/194,562, filed on Apr. 3, 2000, provisional application No. 60/194,578, filed on Apr. 5, 2000.

(51) Int. Cl.
*G06F 17/30* (2006.01)
(52) U.S. Cl. .................................................. 707/934
(58) Field of Classification Search ........... 707/1, 707/2, 3, 41, 5, 6, 7, 104, 203, 100, 609, 707/705, 765, 802, 934, E17.039; 705/1, 705/4, 7, 10, 36, 37, 28, 52, 54, 80, 1.1, 36 R; 709/202, 224, 331; 706/13, 16; 382/190
See application file for complete search history.

(56) References Cited

U.S. PATENT DOCUMENTS

| 5,251,131 | A | | 10/1993 | Masand et al. |
|---|---|---|---|---|
| 5,287,496 | A | | 2/1994 | Chen et al. |
| 5,406,477 | A | | 4/1995 | Harhen |
| 5,440,481 | A | * | 8/1995 | Kostoff et al. ............... 1/1 |
| 5,537,590 | A | | 7/1996 | Amado |

(Continued)

FOREIGN PATENT DOCUMENTS

WO    WO 9514280 A1    5/1995

(Continued)

OTHER PUBLICATIONS

Ava Shillin-Wolf, "The Detection of Research Themes: A Co-Word Analysis of Title Words from Research Articles Published in the Educational Administration Quarterly (1965-1990)", 1995, pp. 1-238.*

*Primary Examiner*—Fred I Ehichioya

(57) ABSTRACT

Operator system algorithm with ability to aid strategic decision-making. Multi-Term Frequency analysis has many embodiments. It has the capability of recursiveness and feedback, and with the capacity to self-modify its operators, as well as having the capability to follow externally set rules, as contained in an axiom set, for example, or as custom imposed by a user. Operator system is set up in the context of basic axioms of a particular field of application, which direct to an extent what the operators do. A preferred embodiment extensively dealt with shows its application as a decision aid over the field of patents and technical literature, helping to organize in a productive manner a mass of data, with useful scores and indices as output.

20 Claims, 38 Drawing Sheets

Initial Definitions

U.S. PATENT DOCUMENTS

| | | | |
|---|---|---|---|
| 5,623,679 A | 4/1997 | Rivette et al. | |
| 5,623,681 A | 4/1997 | Rivette et al. | |
| 5,655,116 A | 8/1997 | Kirk et al. | |
| 5,701,400 A | 12/1997 | Amado | |
| 5,717,835 A | 2/1998 | Hellerstein | |
| 5,742,776 A | 4/1998 | Toda | |
| 5,799,325 A | 8/1998 | Rivette et al. | |
| 5,933,822 A * | 8/1999 | Braden-Harder et al. | 707/5 |
| 5,974,412 A * | 10/1999 | Hazlehurst et al. | 707/3 |
| 5,978,784 A | 11/1999 | Fagg, III et al. | |
| 5,991,751 A * | 11/1999 | Rivette et al. | 707/1 |
| 5,991,780 A | 11/1999 | Rivette et al. | |
| 5,999,907 A | 12/1999 | Donner | |
| 6,009,407 A | 12/1999 | Garg | |
| 6,016,394 A | 1/2000 | Walker | |
| 6,038,561 A | 3/2000 | Snyder et al. | |
| 6,041,303 A | 3/2000 | Mathews | |
| 6,094,649 A | 7/2000 | Bowen et al. | |
| 6,141,699 A | 10/2000 | Luzzi et al. | |
| 6,510,406 B1 * | 1/2003 | Marchisio | 704/9 |
| 7,130,848 B2 * | 10/2006 | Oosta | 1/1 |
| 7,333,984 B2 * | 2/2008 | Oosta | 1/1 |
| 2002/0062302 A1 * | 5/2002 | Oosta | 707/1 |
| 2004/0181427 A1 * | 9/2004 | Stobbs et al. | 705/1 |
| 2005/0165736 A1 * | 7/2005 | Oosta | 707/2 |

FOREIGN PATENT DOCUMENTS

| | | |
|---|---|---|
| WO | WO 9855945 A1 | 12/1998 |
| WO | WO 9939289 A2 | 8/1999 |
| WO | WO 9939289 A3 | 8/1999 |
| WO | WO 9939290 A1 | 8/1999 |
| WO | WO 9944335 A2 | 9/1999 |
| WO | WO 0055791 A2 | 3/2000 |
| WO | WO 0055791 A2 | 9/2000 |
| WO | WO 0057327 A1 | 9/2000 |
| WO | WO 0063824 A2 | 10/2000 |

* cited by examiner

An Example of Source Data
Infrared Technology

| | 01 photoreceptor or photo-receptor | 02 digital image | 03 digital scan | 04 remote network or wireless network | 05 thermal image | 06 optic align |
|---|---|---|---|---|---|---|
| A near infrared | 12 | 9 | 1 | 1 | 18 | 22 |
| B far infrared | 0 | 0 | 0 | 0 | 3 | 12 |
| C infrared | 62 | 87 | 20 | 34 | 263 | 249 |

Fig. 4

Patent Crosstab Report

| Assignee | Document ID | Title | Issued | Document Type | Hits | Weighted Hits | Weighted Action | C01 | C02 | C03 | C04 | C05 | C06 |
|---|---|---|---|---|---|---|---|---|---|---|---|---|---|
| Object Weights | | | | | | | | 1 | 1 | 2 | 1 | 1 | 3 |
| He Holdings | 6025595 | Sprite thermal imaging system with electronic zoom | 2/15/00 | US | 3 | 4 | 2 | | 1 | 2 | | | |
| Raytheon | WO 98/35496 | SPRITE THERMAL IMAGING SYSTEM WITH ELECTRONIC ZOOM | 8/13/98 | PCT | 3 | 4 | 3 | | 1 | 1 | | 1 | |
| Raytheon | WO 98/35497 | SPRITE THERMAL IMAGING SYSTEM | 8/13/98 | PCT | 3 | 4 | 4 | | 1 | 1 | | 1 | |
| He Holdings | 5739531 | Sprite thermal imaging system | 4/14/98 | US | 3 | 4 | 3 | | 1 | 1 | | 1 | |
| United States Of America | 4470816 | Thermal sight trainer | 9/11/84 | US | 3 | 5 | 3 | 1 | 1 | 1 | | | 1 |
| Liu, Zhong Qi | 6023637 | Method and apparatus for thermal radiation imaging | 2/8/00 | US | 2 | 4 | 3 | | 1 | 1 | | | 1 |
| Empresa Nacional Bazan de Construcciones Naval Militares | EP 0 611 242 B1 | A SYSTEM FOR THE MONITORING AND DETECTION OF HEAT SOURCES IN OPEN AREAS | 10/20/99 | EP-B | 2 | 4 | 2 | | 1 | | | 1 | |
| Omnicorder Technologies | 5961466 | Method of detection of cancerous lesions by their effect on the spatial distribution of modulation of temperature and homogeneity of tissue | 10/5/99 | US | 2 | 1 | 2 | | 1 | | | | |
| Massachusettes Institute Of Technology | 5909244 | Real time adaptive digital image processing for dynamic range remapping of imagery including low-light-level visible imagery | 6/1/99 | US | 2 | 1 | 1 | | 1 | | | | |
| Vachtsevanos, George J. | 5815198 | Method and apparatus for analyzing an image to detect and identify defects | 9/29/98 | US | 2 | 4 | 4 | | 1 | 1 | | | |
| United States Of America | 5756990 | Simplified simulation of effects of turbulence on digital imagery | 5/26/98 | US | 2 | 1 | 2 | | 1 | | | | |
| Hughes Electronics | 5737119 | Thermal imaging device | 4/7/98 | US | 2 | 4 | 2 | | 1 | | 1 | | 1 |
| Hughes Electronics | 5673143 | Thermal imaging device with selectively replaceable telescopic lenses and automatic lens identification | 9/30/97 | US | 2 | 4 | 2 | | 1 | 1 | | | |
| Eastman Kodak | 5668596 | Digital imaging device optimized for color performance | 9/16/97 | US | 2 | 3 | | | 1 | 1 | | 1 | |
| He Holdings Dba Hughes Electronics | EP 0 762 173 A2 | THERMAL IMAGING DEVICE | 3/12/97 | EP-A | 2 | 4 | 1 | 1 | | | | 1 | 1 |

Fig. 7

Assignee Rollup

| Rank | Assignee | Hits | Patents | Recent Hits | Recent Patents | Weighted Hits | Weighted Action | C.C01 | R.C01 | C.C02 | R.C02 | C.C03 | R.C03 | C.C04 | R.C04 | C.C05 | R.C05 | C.C06 | R.C06 |
|---|---|---|---|---|---|---|---|---|---|---|---|---|---|---|---|---|---|---|---|
| | Patents | | | | | | | 62 | | 87 | | 20 | | 34 | | 263 | | 249 | |
| | Issued Patents | | | | | | | 49 | | 65 | | 17 | | 23 | | 206 | | 222 | |
| | Applied Patents | | | | | | | 13 | | 22 | | 3 | | 11 | | 57 | | 27 | |
| | Recent Patents | | | | | | | 16 | | 33 | | 10 | | 11 | | 55 | | 40 | |
| | Issued Recent Patents | | | | | | | 14 | | 22 | | 7 | | 7 | | 44 | | 34 | |
| | Applied Recent Patents | | | | | | | 2 | | 11 | | 3 | | 4 | | 11 | | 6 | |
| | Dominance | | | | | | | 0.48 | | 0.26 | | 0.20 | | 0.44 | | 0.48 | | 0.40 | |
| | Recent Dominance | | | | | | | 0.44 | | 0.18 | | 0.20 | | 0.18 | | 0.27 | | 0.28 | |
| | Issued Innovation Factor 4 | | | | | | | 0.33 | | 0.62 | | 0.69 | | 1.29 | | 0.10 | | 0.17 | |
| | Applied Innovation Factor 4 | | | | | | | 0.64 | | 0.87 | | 0.33 | | 0.50 | | -0.02 | | 0.19 | |
| | Predictive Innovation Factor 4 | | | | | | | 0.31 | | 0.25 | | -0.36 | | -0.79 | | -0.12 | | 0.02 | |
| 1 | Eastman Kodak | 43 | 42 | 4 | 4 | | | 3 | | 3 | | 1 | | | | 30 | 3 | 6 | 1 |
| 2 | United States Of America | 34 | 31 | 4 | 2 | | | | | 2 | 1 | | | | | 11 | 2 | 21 | |
| 3 | Texas Instruments | 20 | 20 | 3 | 3 | | | | | 2 | | | | 3 | | 13 | 3 | 2 | |
| 4 | Xerox | 18 | 18 | 4 | 4 | | | 17 | 3 | | | | | | | | | | |
| 5 | Minnesota Mining & Manufacturing | 17 | 17 | 2 | 2 | | | 2 | | 1 | 1 | 1 | 1 | | | 14 | 1 | 3 | |
| 6 | Intl Business Machines | 16 | 16 | 2 | 2 | | | | | 1 | | | | 12 | 2 | | | | |
| 7 | Hughes Electronics | 16 | 13 | 3 | 2 | | | | | 1 | | | | | | 10 | 2 | 5 | 1 |
| 8 | Raytheon | 15 | 11 | 12 | 8 | | | | | 5 | 2 | 2 | 2 | | | 6 | 6 | 2 | 2 |
| 9 | Hughes Aircraft | 14 | 13 | 1 | 1 | | | | | | 1 | | | | | 3 | | 11 | 1 |
| 10 | Westinghouse Electric | 12 | 12 | | | | | | | | | | | | | 2 | | 10 | |
| 11 | Thermoscan | 12 | 12 | 5 | 5 | | | | | | | | | | | | | 12 | 5 |
| 12 | Konica | 12 | 12 | 5 | 5 | | | | | 2 | | | | | | 3 | 1 | | |
| 13 | Polaroid | 12 | 12 | | 1 | | | 9 | 4 | | | | | | | 8 | | 2 | |
| 14 | Barr & Stroud | 10 | 10 | 1 | | | | | | | | | | | | 1 | | | |
| 15 | Matsushita Industrial Electric | 10 | 10 | 3 | 3 | | | | | 2 | 1 | | | | | 9 | 3 | 9 | |

Assignee Indices
Assignee Rollup

Cell Indices - Definitions

Innovation Factor 4 (Applied or Issued)

Innovation Factor 4 =

$$\left[\frac{(A-B)}{B} \times 6\right] + \left[\frac{(B-C)}{C} \times 5\right] + \left[\frac{(C-D)}{D} \times 4\right] + \left[\frac{(D-E)}{E} \times 3\right] + \left[\frac{(E-F)}{F} \times 2\right] + \left[\frac{(F-G)}{G} \times 1\right]$$

Cell Selection Matrix

Cell Selection Index is calculated for each cell based on the implied suitability for joint ventures or internal development:

| | | 01 photoreceptor or photo-receptor | 02 digital image | 03 digital scan | 04 remote network or wireless network | 05 thermal image | 06 optic align |
|---|---|---|---|---|---|---|---|
| A | License | 4 | 4 | 1.25 | 1.25 | 6 | 0 |
| B | License | | 15 | 5 | 10.5 | 0 | 14 |
| C | License | 20 | 15 | 5 | 10.5 | 1.75 | 3.5 |
| A | Develop | 6 | 16 | 1.25 | 1.25 | 14 | 0 |
| B | Develop | | | | 7 | 0 | 6 |
| C | Develop | 5 | 15 | 7.5 | 7 | 0.75 | 1.5 |

11001 = {A License, B License, C License}
11002 = {A Develop, B Develop, C Develop}

Fig. 11

Assignee Composite Score

| Rank | Assignee | C01 photoreceptor or photo-receptor | C02 digital image | C03 digital scan | C04 remote network or wireless network | C05 thermal image | C06 optic align |
|---|---|---|---|---|---|---|---|
| 1 | A | 61.4 | 46.1 | 5.1 | 0.0 | 59.0 | 25.0 |
| 2 | B | 0.0 | 55.4 | 0.0 | 0.0 | 26.4 | 80.6 |
| 3 | C | 0.0 | 30.0 | 0.0 | 31.5 | 28.0 | 7.0 |
| 4 | D | 400.0 | 0.0 | 10.0 | 0.0 | 0.0 | 0.0 |
| 5 | E | 40.0 | 30.0 | 0.0 | 0.0 | 26.3 | 0.0 |
| 6 | F | 0.0 | 15.0 | 0.0 | 0.0 | 0.0 | 10.5 |
| 7 | G | 0.0 | 18.5 | 0.0 | 0.0 | 26.8 | 26.8 |
| 8 | H | 0.0 | 147.3 | 28.6 | 0.0 | 30.1 | 20.0 |
| 9 | I | 0.0 | 0.0 | 0.0 | 147.0 | 5.7 | 45.0 |
| 10 | J | 0.0 | 0.0 | 0.0 | 0.0 | 3.5 | 35.0 |
| 11 | K | 0.0 | 0.0 | 0.0 | 0.0 | 0.0 | 59.5 |
| 12 | L | 260.0 | 0.0 | 0.0 | 0.0 | 7.0 | 0.0 |
| 13 | M | 0.0 | 45.0 | 0.0 | 0.0 | 14.0 | 7.0 |
| 14 | N | 0.0 | 0.0 | 0.0 | 0.0 | 1.8 | 31.5 |
| 15 | O | 0.0 | 0.0 | 0.0 | 10.5 | 21.0 | 0.0 |

Fig. 14

Top Assignees Across a Selected Cluster
C02, C03, C05

C02, C03, C05

Eastman Kodak
Minnesota Mining & Manufacturing
Texas Instruments
United States Of America
Hughes Electronics
Polaroid
Raytheon
Matsushita Industrial Electric
Us Philips
He Holdings Dba Hughes Electronics
Honeywell
Agfa-Gevaert
Massachusettes Institute Of Technology
Cairns & Brother
Nec
Raytheon Ti Systems

Fig. 25B

Top Inventors
Eastman Kodak

| Inventor | Hits | Patents | Weighted Hits | Weighted Action |
|---|---|---|---|---|
| Chapman, Derek D. | 10 | 10 | 11 | 4 |
| DeBoer, Charles D. | 8 | 8 | 9 | 5 |
| Evans, Steven | 6 | 6 | 6 | 3 |
| Burberry, Mitchell S. | 3 | 3 | 4 | 3 |
| Schildkraut, Jay S. | 2 | 2 | 3 | 4 |
| Tutt, Lee W. | 2 | 2 | 3 | 3 |
| Momot, David | 2 | 1 | 2 | 3 |
| Bugner, Douglas E. | 2 | 1 | 2 | 4 |
| Byers, Gary W. | 2 | 1 | 2 | 6 |
| Kolb, Jr., Frederick J. | 2 | 1 | 2 | 2 |
| Vogel, Richard M. | 2 | 1 | 2 | 1 |
| Harvey, Donald M. | 1 | 1 | 3 | 4 |
| De Groot, Gerald H. | 1 | 1 | 2 | 5 |
| McIntyre, Dale F. | 1 | 1 | 2 | 1 |
| Simpson, William H. | 1 | 1 | 2 | 3 |
| Bloom, Richard M. | 1 | 1 | 1 | 2 |

Fig. 26

MULTI-TERM FREQUENCY ANALYSIS

This application claims the benefit of Provisional Applications: 60/175,705, filed Jan. 12, 2000; 60/176,935 filed Jan. 18, 2000; 60/180,974, filed Feb. 8, 2000; 60/186,720, filed Mar. 3, 2000; 60/194,562, filed Apr. 3, 2000 and 60/194,578, filed Apr. 5, 2000.

FIELD OF THE INVENTION

This invention relates to an analytical process and tools for assisting in making strategic and tactical business decisions. It relates to decision making in areas including intellectual property, intellectual capability of individuals or teams within an organization, human capital management and marketing. It relates to strategic analysis based on such diverse aspects as human resource searches or company publicity releases.

It uses and analyzes metrics such as, metrics for deciding which companies are pursuing which opportunities, which areas of technology are best-suited for research and development, and which are best for licensing of existing patents, where licensing is one example of multiple types of transactions.

BACKGROUND

A strategic decision-maker making a decision such as "Should Company A acquire Company B" wants as much relevant and objective analysis as possible, to contribute to making educated and better decisions. These data and analyses include answering what is the technology fit between two companies in one or more areas. Other types of decisions that this tool can be used to assess include, but are not limited to: (1) deciding upon a joint venture with one or more companies or parties compared to others; (2) deciding whether to license existing technology in a field, or, to try to develop new technology in fields of intent on one's own with research and development (R&D) funds. It would be very desirable to have a decision-aid process and tool of this type.

A related type of analysis applicable to large organizations, such as the armed forces or large corporations, would utilize human resource data to form a team of the best people for an upcoming project. The strategic formulation of teams based on past performance on similar projects, publication of internal or external activities, and other available human resource data would be advantageous to the large organizations.

There are existing software search tools or programs which can locate patents based on words or phrases which the tool finds in the full text, claims, front page(s) or other aspects of the patents. There are existing software search tools or programs, which can locate patents based on their patent classes or citation references. There are literature search tools, which examine a database of publications and find citations bearing on words or phrases used as search criteria. There are search tools associated with a variety of databases, which one accesses, for example, through a vendor or over the web. These search engines typically review the results of one search result at a time. Some have capabilities to compare two or more search results. In all cases the primary metric is count of records. However, more capability is required for the analysis and scoring, not based on record count alone, of data fields acquired by such search terms. The ability to capture a forward-looking projection or predictive matrix in analyzing data would be useful. A definite need exists for a decision-aid tool that can make comparisons across multiple different searches based on analysis and scores calculated on multiple characteristics of the data.

A strategic decision-aid, therefore, which provides search and analysis ability across multiple searches and also has projection would be extremely useful across a reasonably large number of applications.

SUMMARY OF THE INVENTION

This invention comprises an operator system algorithm with the ability to assist with strategic and tactical decision making. It has recursive and feedback capabilities, the capacity to self-modify its operators and the capability to follow externally set rules, as contained in an axiom set, for example, or as custom imposed by a user (decision-maker). The operator system is set up in the context of basic axioms of a particular field of application, which circumscribes what the operators may do. The operator system algorithm has the capability to make comparisons and carry out analyses across multiple searches. The operator system algorithm analyzes each search relatively in the context of all searches related to a given analysis. The operator system algorithm is typically executed, or run, on a computer system which comprises one or more processing units, memories, storage devices, display devices (e.g., CRT), keyboards, mice, and printers. Additionally the computer system may include one or more modems, Internet connections, Local Area Network (LAN) connections, and Wide Area Network (WAN) connections.

The operators, as described, may include generalized mathematical operators, which together with input data on which they "operate," form an algorithm or process or method deriving analytic information from the input database and which results in useful information which may aid in decision making.

BRIEF DESCRIPTION OF THE DRAWINGS

For a more complete understanding of the present invention and the advantages thereof, reference is now made to the following descriptions taken in conjunction with the accompanying drawings, in which:

FIG. 4 indicates a number of cells configured according to an x-axis listing "objects" and a y-axis listing "actions";

FIG. 7 illustrates a patent cross-tabulation report;

FIG. 8A illustrates an assignee rollup;

FIG. 8B illustrates indices calculated for individual assignees;

FIG. 11 shows the results as a cell selection matrix where the cell selection index is calculated two ways, first for licensing and then for development;

FIG. 14 shows an assignee composite score for corporations identified by capital letters A-O over various cells shown which include C01-C06;

FIG. 24 shows the comparison, based on the sACI, of company A and company B for a number of technologies, technology 1.0, technology 1.1, technology 1.2, technology 2, and so on.

FIG. 25B shows how the top assignees across a selected cluster can be reported out;

FIG. 26 shows how individual top inventors may also be selected out and listed, here, with the criteria of top inventors, in number of inventions, for a particular assignee;

DETAILED DESCRIPTION OF THE PREFERRED EMBODIMENT

Figure 1:
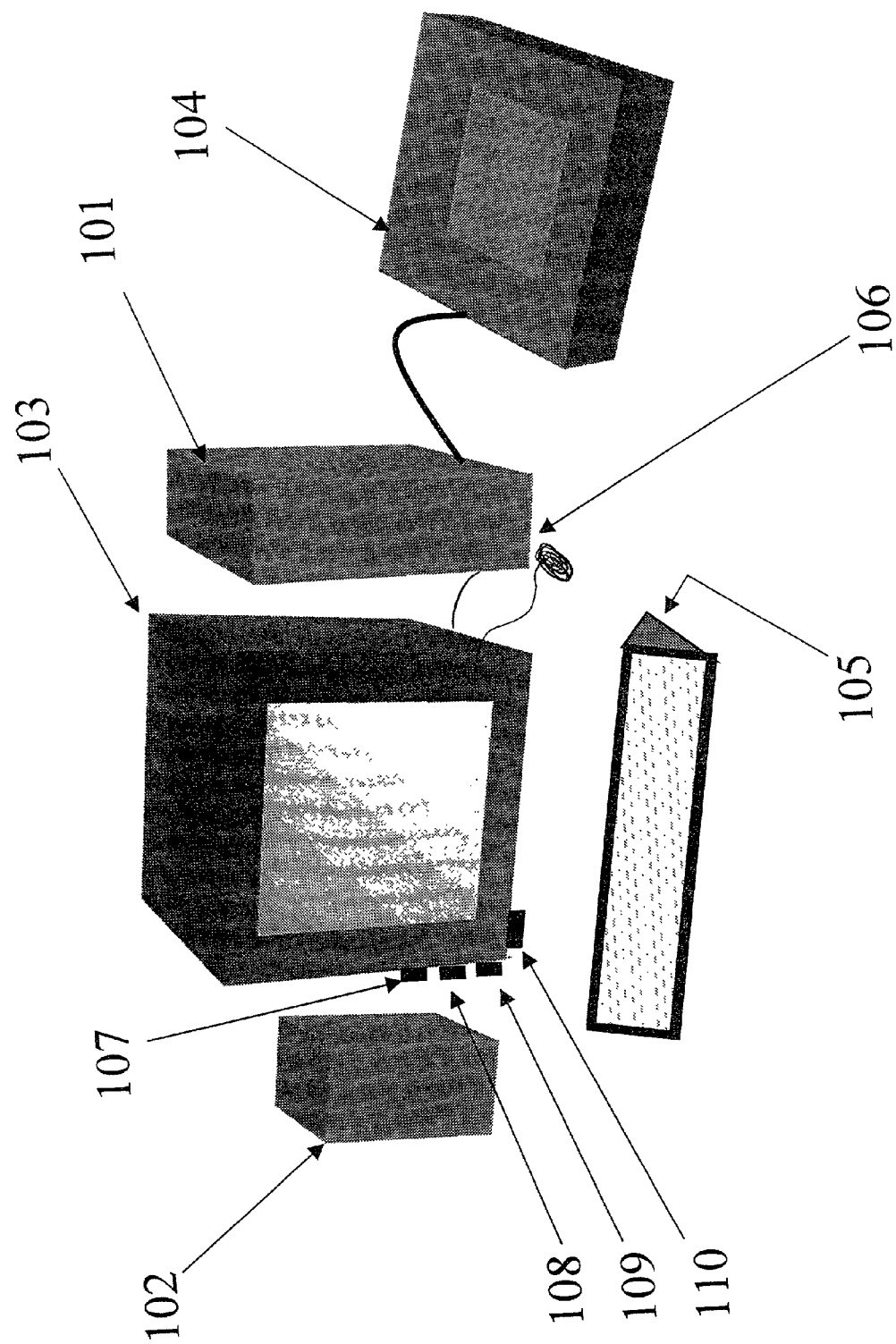
FIG. 1 shows hardware basics of the computer system on which the general operator system algorithm is run, or, executed.

The following description is of the best mode presently contemplated for carrying out the invention. This description is not to be taken in a limiting sense, but is merely made for the purpose of describing the general principles of the invention. The scope of the invention should be determined with reference to the claims.

MTFA builds a landscape of information by searching through patent and literature databases. A technology Landscape can be defined in a basic sense, as a composite of cells where a cell is a bucket of information. The basic cell can be the intersection of two different search terms. A threadword limits the landscape to focus on particular aspects of a technology. Subsequent application search strings and compound class search strings further define and focus the data set. Applications A-J and Compound Class 01-10 are crossed to form a landscape of Cells A01-J10. A Cell contains patent and literature records that fall into each specific combination of a threadword, application, and chemical species. We could also simplify the crafting of a cell by reducing it to one axis of terms where one search would define each bucket, or expand the crafting of a cell to a three dimensional matrix where three axis of terms cross to form a single cell. Looking ahead (FIG. 5), we see the basic Cell 5001, a Cluster 5002, which is a group of "related cells", and the technology Landscape 5003 itself, which is the set of all the Cells. Derived indices and scores are computed from this initial set of data forming the technology Landscape.

Some of the indices or scores are the Cell Selection Index (CSI), the Assignee Composite Score (ACS), the Assignee Cell Index (ACI), the Assignee Field Index (AFI), and the Value of AFI on Clusters (AFI-Cluster). Components of these scores or indices include Patent Investment or "Patents", "Hits", "Recent Patents", Cell Selection Index (CSI), "Recent Hits", "Innovation", "Dominance", and "Predictive Innovation", which are explained in detail below.

MTFA/Technology allows a decision-maker to evaluate multiple dimensions of a technology Landscape. For this description we will look at three dimensions namely, Dominance (Concentration), Innovation (Activity) and Strength. These three concepts are developed in more detail below. However, as an overview, Dominance and Innovation are determined from the record information, such as a holder, company, assignee, or author, and date, of publication, issuance, or entry. These elements are calculated for individual cells or clusters and individual holders within each cell and across the cluster or landscape. Dominance and Innovation are less dependent on the construction of the Landscape than the Strength dimension. The Strength dimension can be determined in multiple ways. One of these ways would be by valuing different search terms or groups of search terms. There is a base level where the all the search terms are equally weighted (described in detail below). The extent of decision-maker input into establishing a search term and a given search term's value relative to other terms can give a more refined strength determination.

One embodiment of the invention utilizes a computer 101 (see FIG. 1) programmed to run algorithms described below, and a memory apparatus 102, such as, a hard-disk storage system to store data and algorithms, and output devices, such as, CRT displays 103 and printers 104, to provide output, such as, display and printed output of computational results of the algorithms. Input/output devices to the computer include keyboard 105, mouse 106, and modem 107, Internet connection 108, Local Area Network (LAN) connection 109 and/or Wide Area Network (WAN) connections 110. Data and algorithms are input into the computer 101. An overall algorithm is selected and the output data is computed and output in readable form 103,104, or stored on a hard disk 102, for example, or relayed through modem 107 or Internet connection 108 to the Internet or to a Local Area Network (LAN) by a LAN connector 109 or Wide Area Network (WAN) by a WAN connector 110 for a user or decision maker to use at present, at a future time, or elsewhere.

Figure 2:
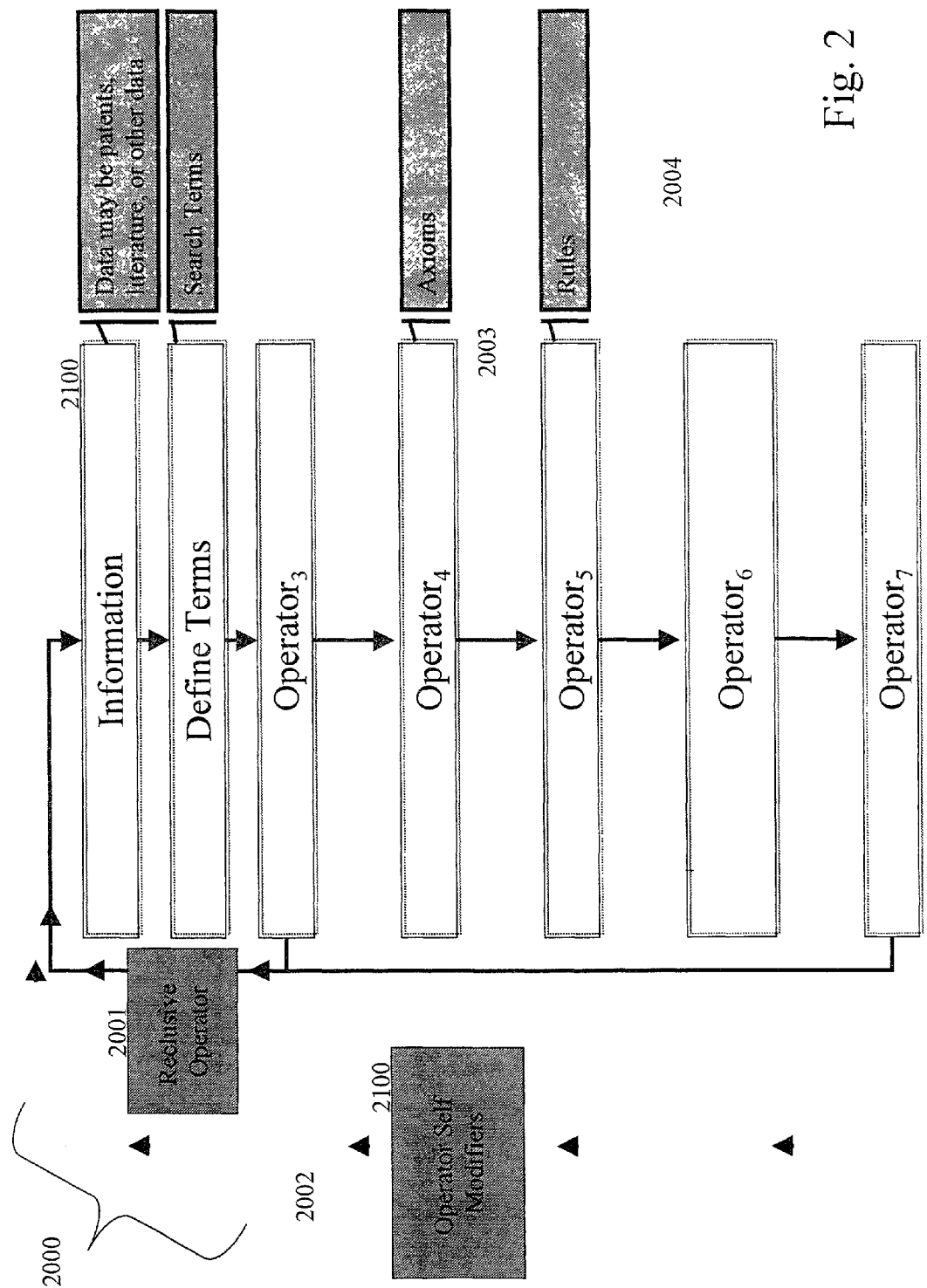
FIG. 2 shows the general operator system algorithm with recursion, feedback, axioms-of-application-area, and client-particular rules.

An embodiment of the invention (see FIG. 2) is an operator system algorithm 2000 with ability to aid strategic and tactical decision making, and which has recursive 2001 and feedback 2002 capability It has the capacity to self-modify its operators 2100. It has the capability to follow externally set rules. Some of these rules are referred to as "axioms" 2003 since they are related to the field of application of an embodiment of the invention and some of which may be referred to as user specific "rules" 2004 since they are related to a particular user's requirements. An operator system 2101 is set up in the context of basic axioms 2003, which direct, or control, to an extent, what the operators do.

A particular embodiment of the operator system algorithm is in terms of such an algorithm applied to the field or area of patents. MTFA/Technology (Multi-Term Frequency Analysis/Technology) is a patent and information mapping process, which builds a picture of a technology and competitive rights landscape using multiple search results, cross-tabulations of frequencies, and inferences from general intellectual asset strategy. The MTFA process produces indices that are used with other knowledge to refine and select actions such as, intellectual asset management, research and development (R&D) options, new product development and competitive benchmarking.

The axioms or assumptions involved in the implementation of this embodiment of the invention applied to the area of patents include (1) investment in a technology is reflected by the patents pursued and the literature published in that technology area. (2) Recent investment in a technology indicates a current interest or activity in the technology area, i.e., a currently active technology area of interest. (3) A technology dominated by a small number of players with significant holdings is harder to penetrate, and is a candidate for licensing. (4) A technology that is fragmented around a large number of players with small holdings is easier to penetrate and is a candidate for research and development. (5) An increase in present patent application activity indicates an increase in future patent activity. (6) Individual searches, i.e., "silos" of information, in a patent technology give too limited of a perspective, but multiple focused searches are more useful and can be successively combined progressively into, "cells", "clusters", and "fields".

Figure 3:
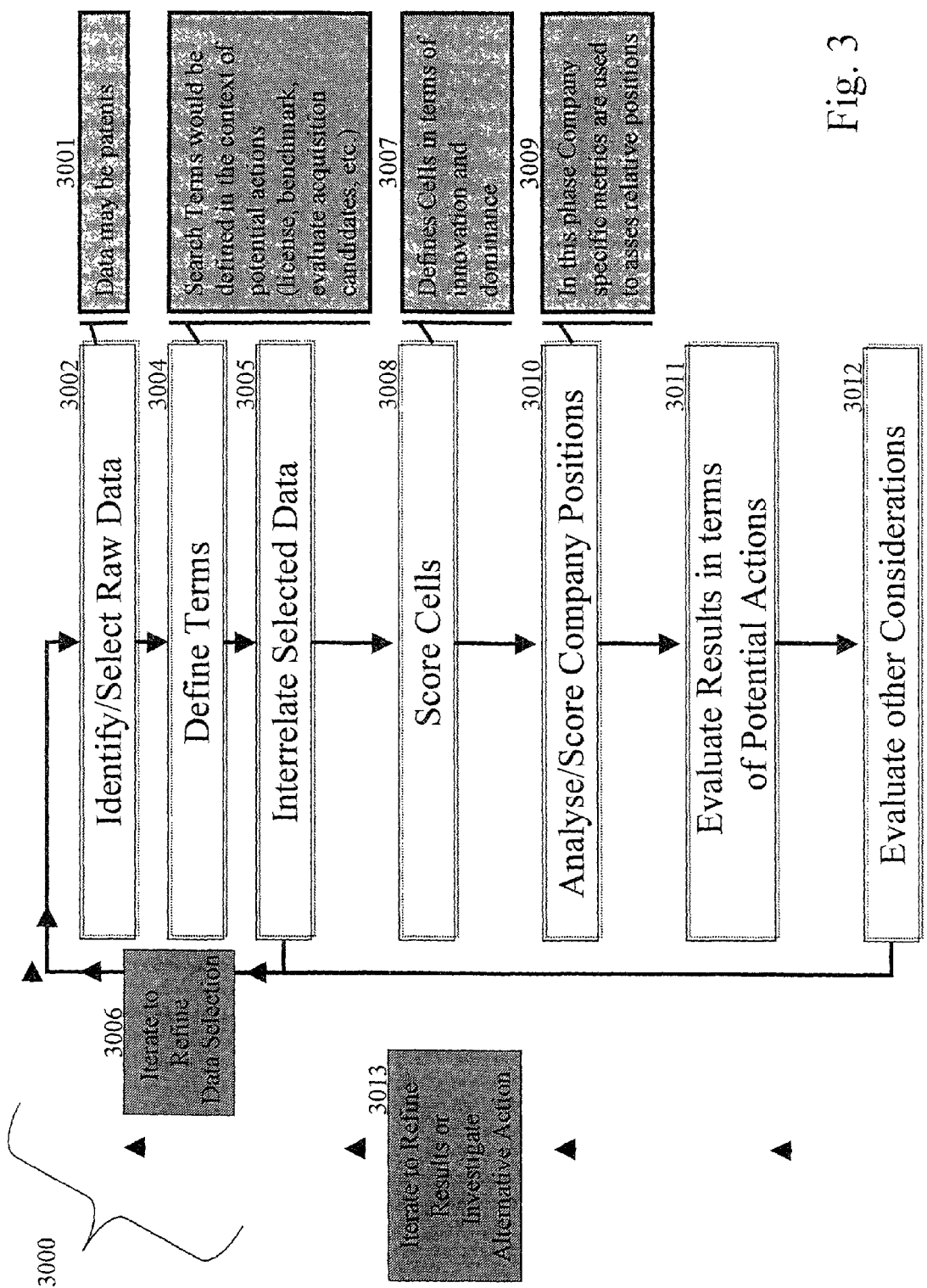
FIG. 3 shows the generalized FIG. 2 now specialized to the patent area.

FIG. 3 shows an operator system algorithm 3000 comprised of a number of different operators 3002, 3004, 3005, 3008, 3010, 3011, and 3012. In addition there are rules and definitions 3001, 3003, 3007, 3009 and iteration or feedback loops 3006, 3013.

The source for the patents searched for may include any patent search tool, such as AURIGIN® (AUREKA IPAM SYSTEM®), DERWENT®, IBM® IP NETWORK, now, DELPHION®, MAPIT®, KNOWLEDGIST®, or CARTIA®. Literature searches may utilise any available commercial or non-commercial literature search tool. The patent search tools or literature search tools comprise a data source for the MTFA algorithm.

To get at Source Data, the specific operator must IDENTIFY/SELECT RAW DATA 3002 from patents, engineering/science literature or other source data available. In order to extract the most value from analysis, Search Terms are defined in terms of a goal, e.g., in or out licensing, benchmarking, and evaluating acquisition candidates, enforcement, infringement analysis, prioritization of development activities, merger integration, and defining IP risks associated with transactions for particular aspects of a technology. Terms may be defined on multiple levels such as key words found in the claims or entire patent, or be a single or collection of patent classes. Search terms are defined by the DEFINE TERMS operator 3004. The operator DEFINE TERMS 3004 output of defined search terms is applied to the raw data passed on by the first operator 3002.

The MTFA process can be an iterative process, using the results from one analysis to help define a second related analysis. For example, top patents or top inventors in a specific area of technological interest may be reported out by MTFA in an initial analysis phase. The details of how this is done are covered below. One or more of that inventor's patents may then be "reverse engineered" manually or through a tool as MAPIT®, KNOWLEDGIST®, or CARTIA® to get relevant search terms. These tools will provide automated calculation to define aspects of a technology. Because MTFA analyzes an operator defined space the user can then choose the most applicable terms for the MTFA analysis.

MTFA incorporates the concept of relevance or altitude into defining the landscape. Strategic and tactical decisions often require an iterative process involving multiple perspectives or levels of information gathering in order to identify an appropriate course of action. MTFA allows a user to take a top down approach rather than a bottom up approach, starting with general concepts, which are sequentially refined and focused to greater detail, rather than initiating a search process with a narrow and limited focus on a single word or patent. The tool itself is useful in providing methods which can be used to help focus altitude.

The third operator shown is INTERRELATE SELECTED DATA 3005. Certain of the search terms ("actions") as given by DEFINE TERMS 3004 are used along one (vertical) axis of a two-dimensional array. Other search terms ("objects") as given by DEFINE TERMS 3004 is used along the orthogonal (horizontal) axis of a two-dimensional array Together these search terms form the Landscape made up of cells, and the interaction of search terms within the Landscape. The INTERRELATE SELECTED DATA acts to fill in the squares defined by the intersections of the action and object search terms, with the patents that fall into the combined category, fitting both search terms. Crafting cells could be simplified by reducing the Landscape to one axis of terms where one search would define each bucket. An expanded version of cells could be done on a three dimensional matrix where three axis of terms cross to form a single cell. Even discreet, individual buckets could be run where comparisons and standardization typically run across other cells are compiled against set values. The basic examples of Cells, as defined by the cross-section of two axes, are discussed below in terms of FIGS. 4 and 5. With each of these versions of interrelating selected data, one may utilize a feedback loop 3006 to iterate on the data selection to refine it according to what is needed. For example, the search terms may be too broad. Human intervention or, a genetic algorithm (not shown), or neural network (not shown) may adjust the results here by refining the selection, either widening or narrowing the input criteria, or by readjusting the criteria altogether.

After the INTERRELATE SELECTED DATA 3005 operator has been applied so as to supply an array of cells groups of patent references including relevant data such as patent number, patent assignee, inventors, and issued date, the SCORE CELLS operator 3008 is applied to each of the defined Cells. For example, if the desired scores for are innovation and dominance and predictive innovation, then the Cells are scored accordingly. The Forth application of the operator ANALYZE/SCORE COMPANY POSITIONS 3010, metrics specific to a company (user) are calculated, which might, for example, assess relative positions of different companies based on the nature of their patent portfolio in the context of all others. The MTFA approach provides a quantitative way of evaluating these positions. Various detailed indices are discussed below, e.g., Cell Selection Index (CSI), Assignee Cell Score (ACS), Assignee Cell Index (ACI), Assignee Field Score (AFI), Assignee Field Index for a Cluster (AFI-cluster). Operators EVALUATE RESULTS IN TERMS OF POTENTIAL ACTIONS 3011 and EVALUATE OTHER CONSIDERATIONS 3012 are then applied. Another feedback iterative loop can be used to REFINE RESULTS/INVESTIGATE ALTERNATIVE ACTION 3013. These are stated as very general operators at this point. For specific embodiments of this invention, these operators take definite forms.

FIG. 4 illustrates one of the basic concepts of a technology Field composed of cells formed by the intersection of "action" search terms along an y-axis and "object" search terms along a y-axis. "Action" and "object" are for identification and have no significance beyond terminology. Examples of "actions" and "objects" include production methods and applications, technologies and applications, compounds and indications. FIG. 4 indicates a number of cells configured according to an x-axis listing "objects" 4001 and a y-axis listing "actions" 4002. For example, cell A01 4003 has 12 patents 4004. It is the intersection of (object 4001) photoreceptor or photoreceptor 4005 (2969 patents 4006) and (action 4002) near infrared 4007 (1681 patents 4008). In FIG. 4, other objects 4001 include digital image 4009 (5004 patents 4059), digital scan 4010 (775 patents 4060), remote network or wireless network 4011 (1224 patents 4061), thermal image 4012 (1672 patents 4062), optic align 4013 (5278 patents 4063). Other actions 4002 include far infrared 4014 (550 patents 4064) and infrared 4014 (21604 patents 4065). The number of patents found under the search term digital image 4009 is 5004 4059. The number of patents found under the search term infrared 4015 is 21604 4065. Those patents having both infrared 4015 and digital image 4009 is 87 4071. This is cell C02 4072.

Figure 5:
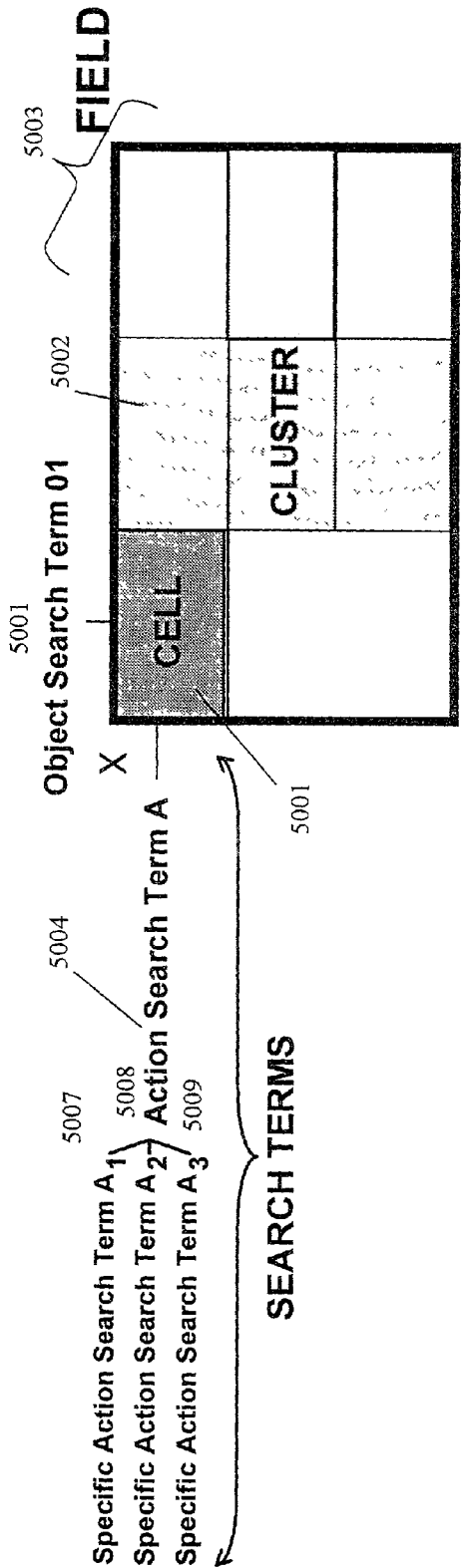
FIG. 5 shows the relationship of a cell, a cluster and a field.

FIG. 5 shows the relationship of a cell 5001, a cluster 5002 and a field 5003. Search term 5004 is a limitation for defining a set of data. It could be a string of text to be found within the text or claims of desired patents, or published papers or a patent classification. A search term may be an action 5004 or an object 5006. Several related specific action search terms 5007, 5008, 5009 may be combined to reflect a single action 5004 simply by having the combined search term 5004 be the logical union of each of the specific action terms which are combined 5007, 5008, 5009. And similarly for "objects" which may also be combined in similar fashion to the way "actions" are combined (not shown). A cell 5001 is an "intersection" of search terms (action 5004×object 5006). Cells can be referenced (e.g., A01 4003, FIG. 4) to depict the combination of source search terms. A cluster 5002 is a group of related cells, such as a column 4081 (FIG. 4) or row 4082 (FIG. 4), or scattered grouping 5002 (FIG. 5). Related cells may be related because it has turned out that a number of the same patents turn up in each cell of the cluster. These clusters are "naturally" related, in that they are a byproduct of part of the analysis procedure. They are fall-out from the construction of the technology Field. In addition to naturally occurring clusters, any cluster can be defined on almost any basis that the MTFA is capable of applying such as, cells with a high cell score of innovation or dominance. A field is a patent landscape defined by the composite of all cells.

Figure 6:
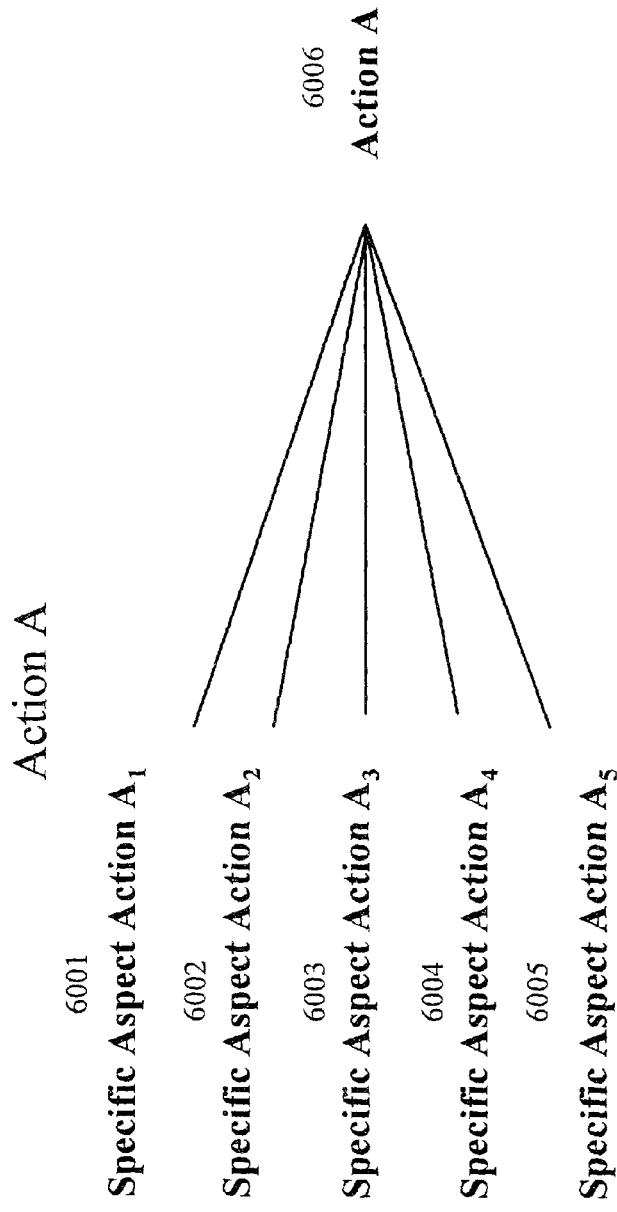
FIG. 6 illustrates specific aspect actions $A_1, A_2, A_3, A_4, A_5$ rolled into one action data set, action A.

Search terms are enumerated in conjunction with a client according to the client's question. Additional suitable search terms may be generated from Mapit®, KNOWLEDGIST®, or CARTIA® applied to a key patent or a key paragraph. This application of MAPIT®, KNOVLEDGIST®, or CARTIA® "reverse engineers" or "deconstructs," a patent, or key paragraph, to come up with a list of relevant search terms for the subject patent or paragraph which are then further applied by MTFA/Technology to find additional relevant patents. In addition, search terms may be rolled up into one "co-ordinate point". Any of the search terms at that "co-ordinate point" will act to project out (in the sense of a mathematical projection operator) patents from the data source. FIG. 6 shows specific aspect actions $A_1$ 6001, $A_2$ 6002, $A_3$ 6003, $A_4$ 6004, $A_5$ 6005 rolled into one action data set, action A 6006.

Search Terms can also be designed into the Landscape (as will be seen below in detail). Examples of search terms include search terms derived from: (a) a set of patents invented by the top inventors in a Technology Landscape; (b) patents, which cite either forward or backward, one or a series of key patents known to be relevant to a given question; (c) key patents identified by the decision-maker as related to the Technology Landscape. These terms can be assigned a weight to increase their Strength and impact on the MTFA analysis or they can be included without weighting and provide a measure of Strength through Breadth and patents having greater hits. These types of terms can also be useful for identifying key clusters within a Landscape, upon which to do a MTFA analysis on the Cluster (see below), to calculate the AFI (see below) for the Cluster and identify patents which fall into the Cluster related to these key decision-maker constructed search term data sets.

Additional, fine-tuning of information extraction includes assigning weight to individual patents, which are identified by the decision-maker as critical to the landscape. This requires the greatest effort on the part of the operator to identify such patents and the greatest understanding of the landscape. This typically would be performed on more narrowly defined MTFA Landscapes.

There are several basic reports that MTFA/Technology produces from the input data and the search terms. The first is a "Patent Cross-Tabulation Report". It provides a useful summarisation of various information involving assignees and patents. A different report is the "Assignee Rollup". It also provides a useful summarisation of various information involving assignees and patents. These two reports contain data about patents, and have been "massaged" to a first order that can provide a jumping off point for further calculations of different scores and indices.

FIG. 7 shows a patent cross-tabulation report. The first column shows the assignee 7001, the second column lists a document identification (ID) 7002, which may be a patent number 7011, the document title 7003, the date issued 7004, document type 7005, the number of hits (see below) 7006, the number of weighted hits (see below) 7007, the weighted action (see below) 7008, as well as the number of patents falling into the cells defined by the criteria C01 7009, for example, and cell C02 7010 as another example. Shown are additional cells C03, C04, C05, and C06, which would be considered in a similar fashion as cells C01 7009 and C02 7010. Those additional cells are not discussed further here.

The number of cells a patent "hits", i.e., appears in, demonstrates the breadth of a patent with respect to the Landscape. A weighted hit is the number of cells a patent "hits" with higher value assessed by the user to more important (to the decision-maker) cells. For example, if a patent is found in cells C01, C02, C03 and C04, and C02 and C04 have been weighted as "2" and C01 and C03 are not weighted, the hits would be 4 and the weighted hits would be 6. This demonstrates breadth of a patent with an emphasis on prioritized areas. A weighted action (could be an object) is the total number of times a patent hits a specific action search term, but with a numerical multiplier that multiplies that total number. A higher multiplier is give to what the user assigns as the more important specific action search terms. This demonstrates relevance of a patent in prioritized aspects of the Landscape. The breadth (as will be seen in detail below), defined as hits per patent, is calculated for individual patents and the average hits per patent for a given assignee or cell or group of assignees or cells. Breadth relates to the "strength" of patents with respect to the coverage of a particular technology. By reviewing patents with a large number of hits or weighted hits, one can screen for patents, which may have greater strength and/or relevance.

Weighting of Search Terms (as will be seen in more detail below) will place greater value on certain Cells within the Landscape. A search term, which is identified to be of greater importance to a given question, may be assigned a weighting factor. Assigning a greater weight is accomplished by modifying the value an individual patent received for being identified in a particular search term and each of the cells associated with a search term.

For example a landscape could be created with the following terms and relative value where:

| Terms | | A | B | C |
|---|---|---|---|---|
| | Values of Terms→ | 3 | 1 | 2 |
| X | | 2 | 2.5 | 1.5 | 2 |
| Y | | 1 | 2 | 1 | 1.5 |

For example the Cell YC would have a value of 1.5, the average of the Y term value of 1 and the C term value of 2. Each patent identified in this cell would be given a weight of 1.5 in the database. This process requires sufficient knowledge of the decision-maker of the components of the Landscape and the key aspects of the question being asked in the analysis.

Figure 8B:
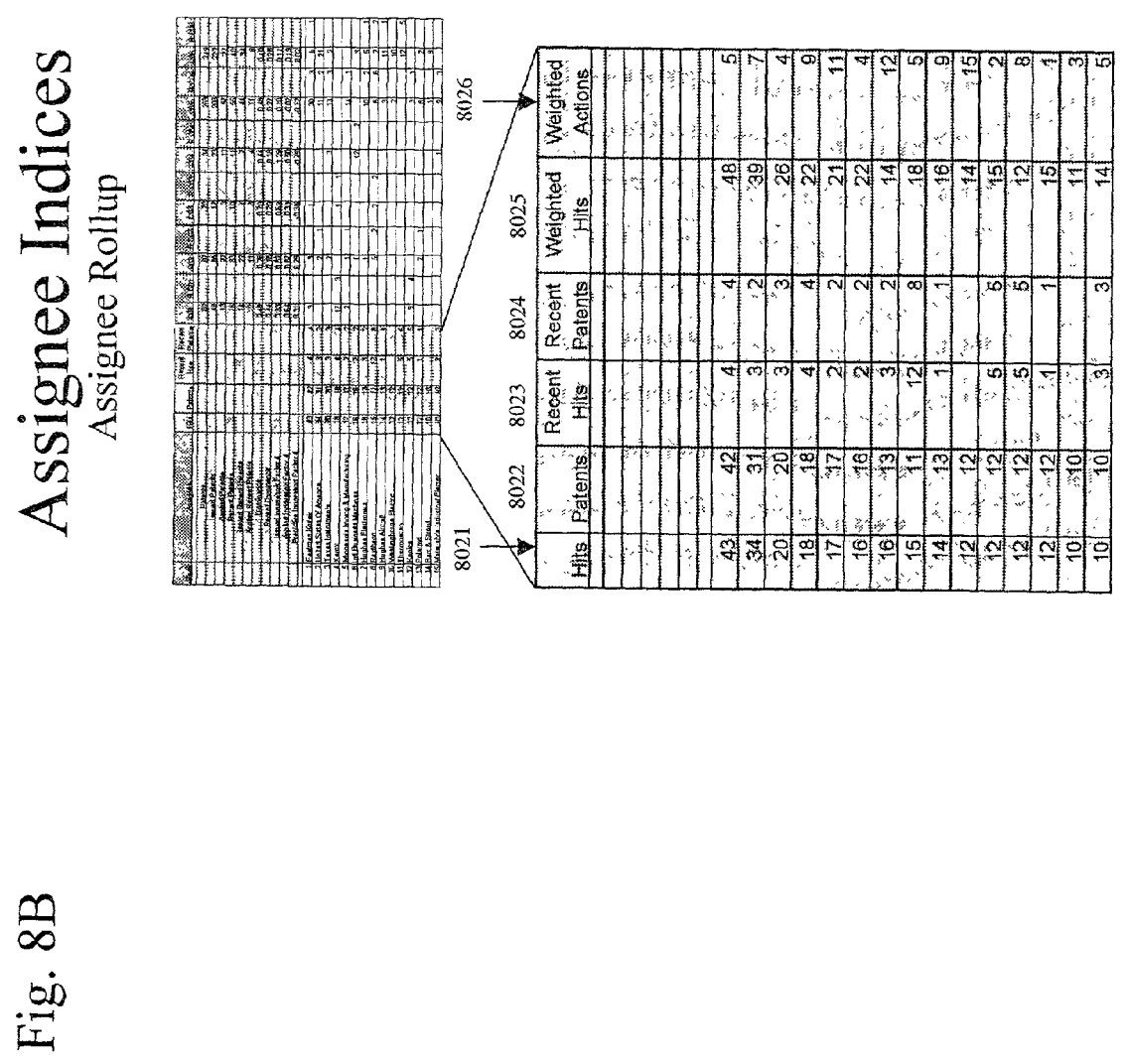

FIG. 8 shows an assignee rollup. On the upper left 8001 is shown various cell measures or indices by name: (total) patents 8002, which is composed of issued patents 8003 and applied patents 8004, recent patents 8005 which are included in the total patents 8002 and which include both issued recent patents 8006 and applied recent patents 8007. The measures, or indices, shown include dominance 8008, recent dominance 8009, issued innovation factor 4 8010, applied innovation factor 4 8011 and predictive innovation factor 4 8012. Investment may be used to denote, and may be defined as, the number of patents 8002 in a cell, both issued 8003 and applied 8004. Dominance 8008 is the measure of the percentage of patents, overall, and in recent years (recent dominance 8009), assigned to the top 10% of assignees. Innovation (8010, 8011) is a measure of recent patent activity in a cell for issued 8006 and applied (for) patents 8007. Predictive innovation is the difference between applied 8011 and issued innovation 8012. This word statement of various mathematical definitions may be more clearly understood by examining the mathematical statements and use in an example, below.

In more detail, investment, i.e., number of patents, includes as patents, all unique patents, as issued patents, included are all unique U.S. and EPO-B patents, and as applied (for) patents, all unique PCT and EPO-A patents. Recent patents are all unique patents issued within two years of the last patent issued in the data set. Recent applied (for) patents includes unique PCT and EPO-A patents issued within two years of the last patent issued in the data set. Japanese and other individual international patent issuances and applications can readily be included.

Assignee indices in the lower left center area of FIG. 8, 8020 include hits 8021, patents 8022, recent hits 8023, recent patents 8024, weighted hits 8025, and weighted action 8026. Hits 8021, the number of cells an assignee's holdings fall into, demonstrates the breadth of assignee's holdings. Patents 8022, the number of unique patents across the field, demonstrates the assignee's investment, viz. "investment" is defined as the number of patents. Weighted hits 8025, the number of cells an assignee's holdings fall into with a multiplier value given to more important cells, as described in the above discussions of weighting, demonstrates the breadth of a patent across prioritized areas. Weighted action 8026, the number of specific action search terms an assignee hits, but with multiplier applied to more important specific action search terms, demonstrates the relevance of a patent to prioritized aspects of the action. Recent hits 8023 and recent patents 8024 are similar to hits 8021 and patents 8022, but are the patents issued within two years of the last patent issued in the data set and reflect an assignees' recent activity.

Figure 9:
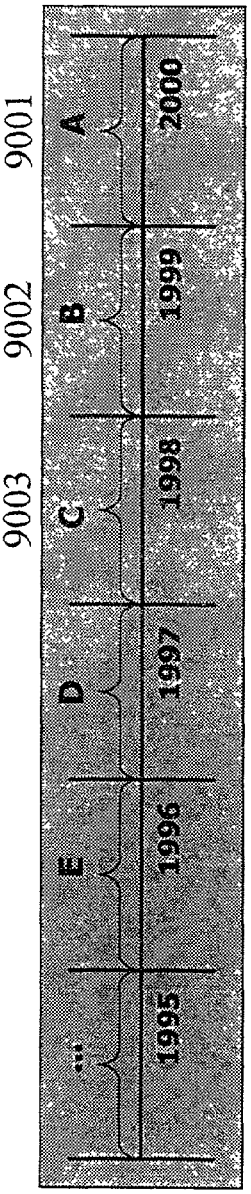
FIG. 9 shows Innovation Factor-1 defined in terms of the number of patents in a block of time extending back from the time of issue of the latest patent considered.

Innovation Factor 1 9000 (See FIG. 9) is defined in terms of the number of patents in a block of time extending back from the last time of issue of the last patent considered. Thus for a last considered patent issued Dec. 1, 2000, the number of patents from Dec. 2, 1999 to Dec. 1, 2000 is denoted A 9001. The number of patents in the preceding year time block Dec. 2, 1998 to Dec. 1, 1999 is denoted B 9002. The number of patents in the year time block preceding this last, from Dec. 2, 1997 to Dec. 1, 1998 is denoted as C 9003. By definition:

$$\text{Innovation Factor } 1 = (A/([B+C]/2))$$

where:

A=the number of patents issued (applied) within one year of the last patent issued in the data set; B=the number of patents issued (applied) more than one year but less than two years prior to the issuing of last patent in the data years set; C=the number of patents issued (applied) more than two years but less than three years prior to the issuing of last patent in the data set.

Figure 10:
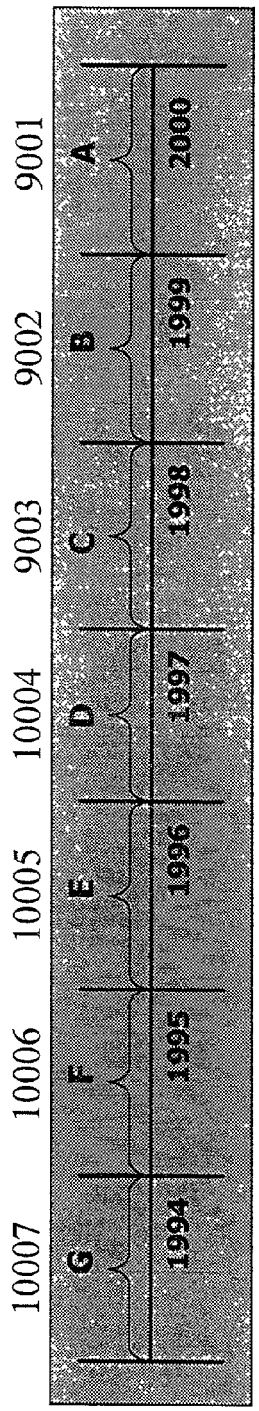
FIG. 10 shows Innovation Factor-4 defined in terms of the number of patents in a block of time extending back from the time of issue of the latest patent considered over a previous seven year span, with weighting factors applied to the relative differences in patents per defined yearly block.

Similarly, Innovation Factor 4 (See FIG. 10, 10010) is defined over a previous seven year span, with a weighting factor of 6 10011 applied to the most recent relative difference (A−B/B) 10012 in patents per defined yearly block as in the definition of Innovation Factor 1 9000. The successive weighting factors applied to the relative patent differences receding in time are 5 10013, 4 10014, 3 10015, 2 10016 and 1 10017, and normalized by their sum, including 6 10011, 21 10018. Thus:

$$\text{Innov. Fct. } 4 = (1/21)\{6(A-B)/B + 5(B-C)/C + 4(C-D)/D + 3(D-E)/E + 2(E-F)/F + 1(F-G)/G\}$$

Both the particular weightings of Innovation Factor 1 and Innovation Factor 4 derive from a combination of heuristic notions about how to utilize patent data historically, in this case, and numerical investigations of how well different weightings work.

Predictive innovation is the difference between applied and issued innovation factors. Applied innovation is innovation calculated for applied patents, as above, and issued innovation is innovation applied to issued patents, as above.

Dominance, when calculated as "10% Dominance" per search term, is defined as the ratio of patents held by the top 10% of assignees holding patents within that cell, to (divided by), the total number of patents within that cell. It should be noted that 10% is a somewhat arbitrary choice; however, it has worked well in practice. The 10% Recent Dominance per search term is then defined analogously as the ratio of the number of recent patent held by the top 10% of assignees holding recent patents within that cell, to the total number of recent patents within that cell.

In order to determine quantitatively cell-by-cell the suitability of the Intellectual Property landscape under investigation, a Cell Selection Index (CSI) (defined below) is calculated based upon (1) Issued Innovation Factor 4, (2) Applied Innovation Factor 4, (3) Dominance, (4) Recent Dominance, and (5) Predictive Innovation. Within each index and across the Landscape, these indices are ranked in quartiles. For license calculations, the higher valued innovation, dominance, and predictive innovation scores are ranked in the fourth (i.e., highest) quartile. Innovation scores less than 1 are ranked as zero. For development calculations the higher valued innovation and predictive innovation scores are ranked in the fourth quartile and lowest dominance scores are ranked in the fourth (i.e., highest) quartile. Innovation scores less than one are ranked as zero.

FIG. 11 shows the results as a cell selection matrix. The Cell Selection Index (CSI) is an "assignee independent" score and provides a selection criteria for the evaluation of cells across the entire Technology Landscape for either licensing or development activities. The cell selection index is calculated two ways, first for licensing 11001 and then for development 11002. The Cell Selection Index (CSI), (for licensing or development) is given by:

$$CSI = (AvDom) \cdot (AvInn) \cdot (PredInn)$$

where these three factors are multiplied together.

AvDom stands for ½ (dominance quartile+recent dominance quartile).

AvInn stands for ½ (issued innovation quartile+applied innovation quartile).

PredInn stands for Predictive Innovation quartile.

There being 4 quartiles, the highest score possible is 64 (=4·4·4).

The Cell Selection Index is not a patent count. Rather, the Cell Selection Index scores each cell with respect to either a license or develop strategic decision based on three components:

Innovation: measures the trend of recent patent activity taking into account patent life and changes in activity.

Dominance: determines how fragmented or concentrated a Cell is among Assignees.

Predictive Innovation: provides a forecast of future activity.

The Cell Selection Index prioritizes choices for potential actions for either development, e.g. funding an R&D project, or licensing, where licensing can apply to any type of IP transaction.

The Develop Cell Selection Index scores the Cells with a make/develop strategic decision in mind. The Cell selection score is a composite of three measures, Dominance, Innovation, and Predictive Innovation. A higher develop Cell selection index score consists of low Dominance, indicating a hole in a Cell where someone with the opportunity could develop a strong position, high Innovation, indicating an increased level of patent or publication activity, and high Predictive Innovation, a statistically validated applied patent or publication index which predicts increased future activity.

The License Cell Selection Index scores the Cells with a buy/license strategic decision in mind. The Cell selection score is a composite of three measures, Dominance, Innovation, and Predictive Innovation. A higher develop Cell selection index score consists of low Dominance, indicating a few major players in the Cell, high Innovation, indicating an increased level of patent or publication activity, and high Predictive Innovation, a statistically validated applied patent or publication index which predicts future innovation.

Figure 12:
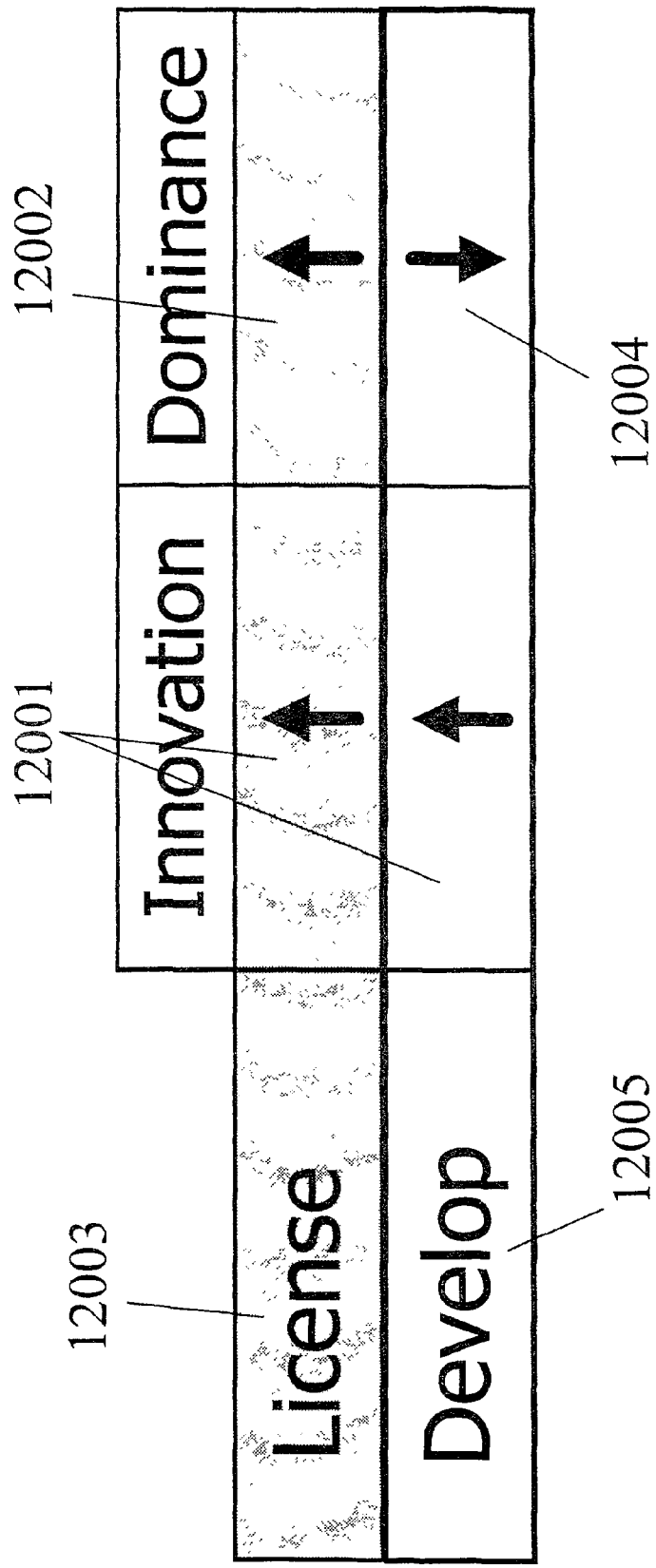
FIG. 12 indicates that high innovation areas are desirable for intervention and that dominance suggests a licensing approach where there is a high dominance, and a development approach where there is a low dominance.

FIG. 12 indicates that high innovation areas 12001 are desirable. When dominance is high 12002, licensing 12003 is indicated while when dominance is low 12004, development 12005 is indicated. FIG. 12 is interpreted to mean that in areas of innovation, i.e., where there is active patenting occurring, the decisive quantity favoring either licensing or development is high or low dominance, respectively.

Figure 13A:
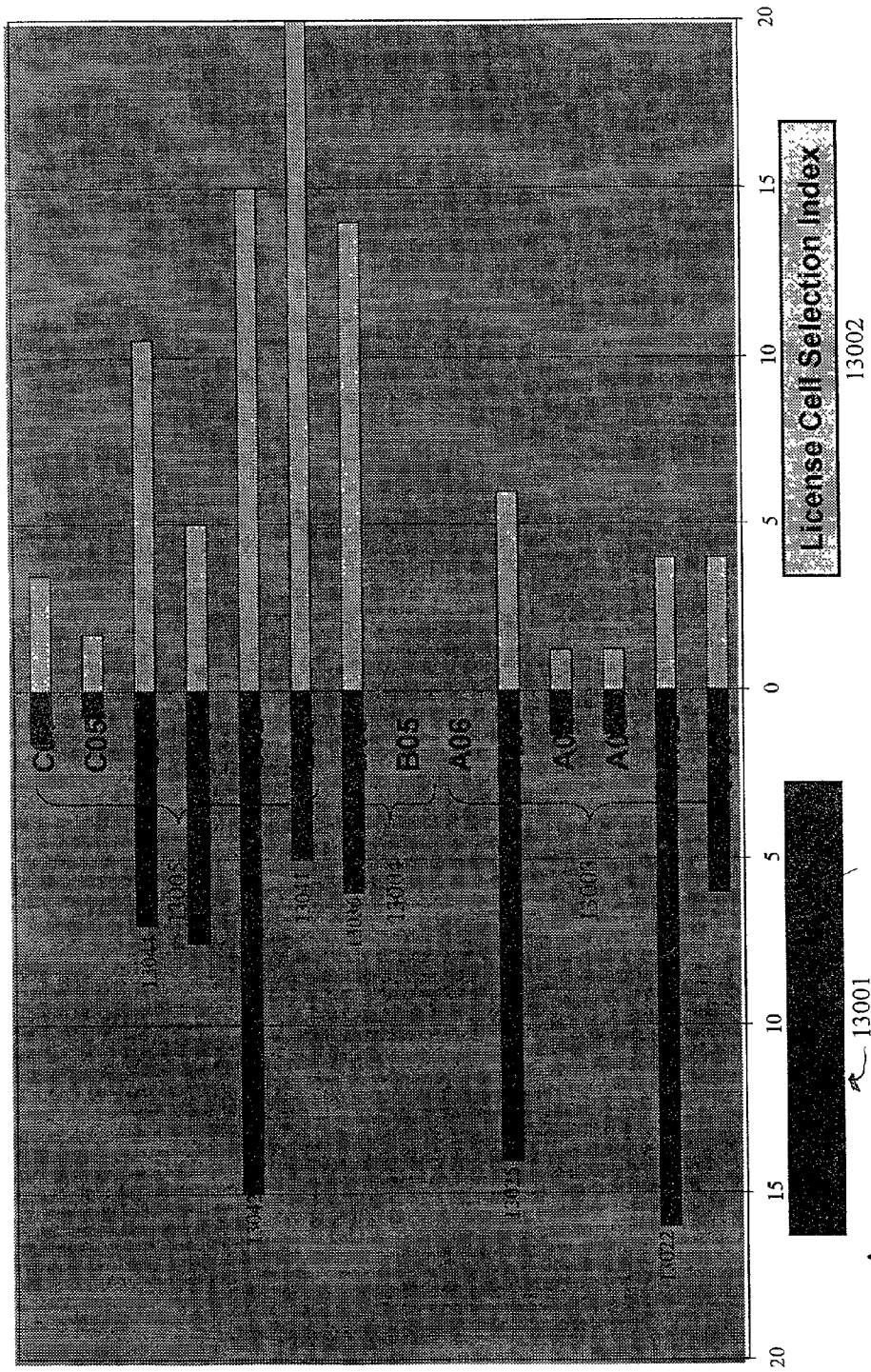
FIG. 13A illustrates cell selection indices for development and cell selection indices for licensing over various cells shown which include A01-A06, B05-B06 and C01-C06.

FIG. 13A illustrates cell selection indices for development 13001 and cell selection indices for licensing 13002 over various cells shown. It is essentially an expanded version of FIG. 12, but arranged differently and with more than one cell presented. These include A01-A06 13003, B05-B06 13004 and C01-C06 13005.

Figure 13B:
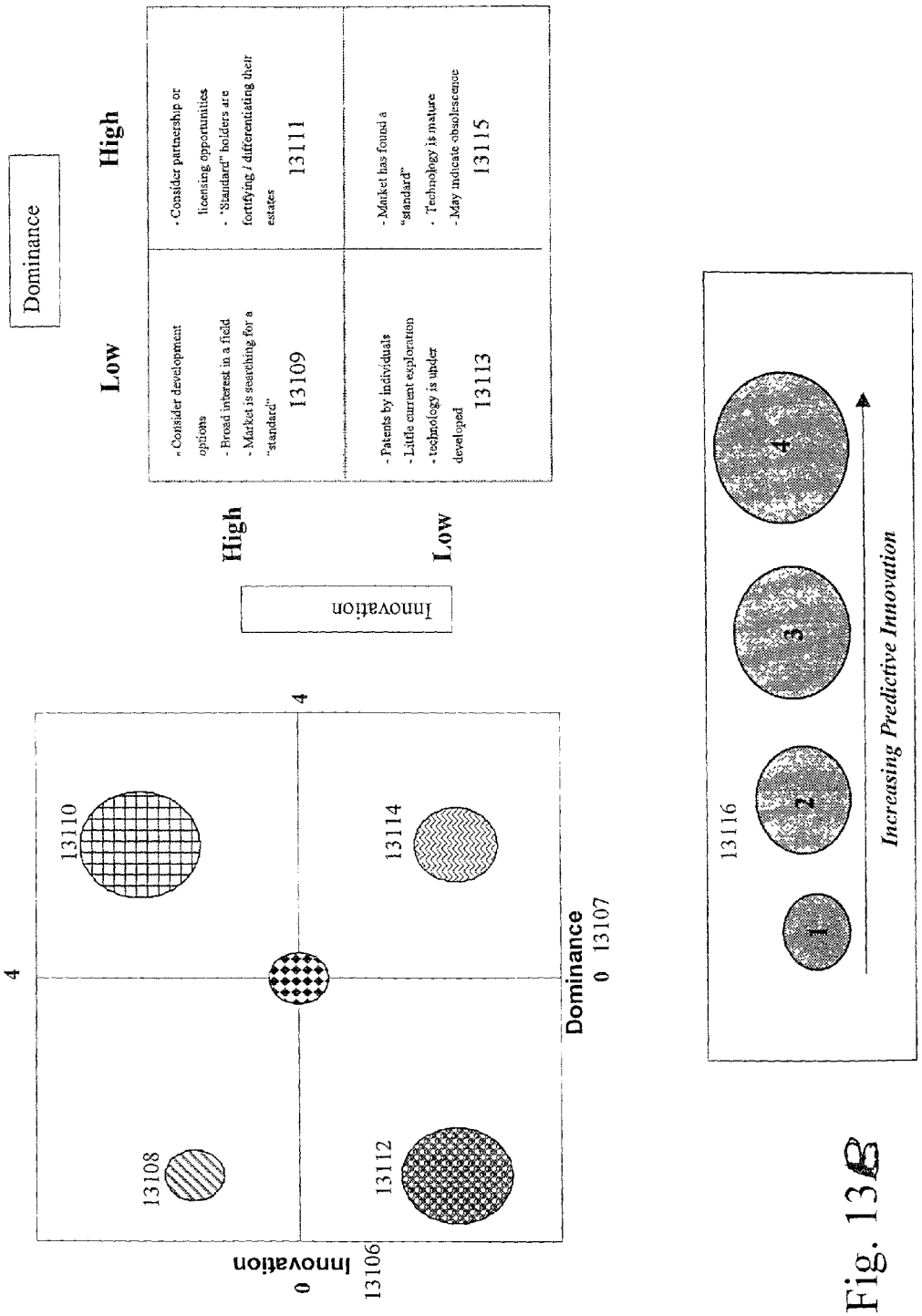
FIG. 13B illustrates how the various aspects of the cell selection score, activity or innovation, concentration or dominance, and predictive activity or innovation can be graphically represented on a bubble chart and interpreted.

FIG. 13B illustrates a bubble chart to examine the innovation 13106 and dominance 13107 indices for particular cells. When innovation is high and dominance is low 13108, development is indicated as defined by the key 13109. When innovation is high and dominance is high 13110, partnership or licensing opportunities exist 13111. When innovation is low and dominance is low 13112, the technology is underdeveloped 13113. And finally, when innovation is low and dominance is high 13114, the market has found a standard, and the technology is mature 13115. As the size of the bubble increases, this indicates that predictive innovation is also increasing 13116.

The cells A02 13022 and A05 13025 show much higher development indices, i.e., high innovation with low dominance. On the other hand cells B06 13036, C01 13041 and to a lesser extent C04 13044 show much higher licensing indices, i.e., high innovation with high dominance. The C02 13042 cell has equally large development and patenting indices. Thus a fundamental input toward decision making, in particular input toward strategic corporate decision making has been shown. Clearly, a human, or humans, will make the decisions in the end. It is clear, however, that, advantageously, a powerful tool to assist in decision making has been invented as shown in this embodiment of the invention.

The Assignee Composite Score (ACS) prioritizes the positions of patent holders within individual cells. Incorporated into the score are the individual assignee's investment and recent investment within the cell and the cell's fitness relative to the landscape. The ACS also calculates a measure of breadth for each Assignee across the landscape or selected cluster of cells. The score therefore will change for each assignee cell as the selection of the field is altered.

An Assignee Composite Score, i.e., ACS, is calculated as follows:

$$ACS = H1 \cdot CSI$$

where the H1 factor, detailed below, is multiplied by the Cell Selection Index, CSI, as described above.

$$H1 = \text{(hits in field/patents in field)} \cdot \text{patents in cell} + \text{(recent hits in field/recent patents in field)} \cdot \text{a recent patents in cell}$$

FIG. 14 shows an example of an assignee composite score. The identity is designated by capital letters A-O 14001. The rank 14002 is based on the overall rank as assignee of patents in the field of infrared technology. The ranking, in this example, is according to the total number of patents which assignee has in a particular technology. The raw ACS (Assignee Composite Score) is shown for the objects, or, sub-areas, of photoreceptor (photo-receptor) 14003, digital image 14004, digital scan 14005, remote network (wireless network) 14006, thermal image 14007, and optic align 14008.

Figure 15A:
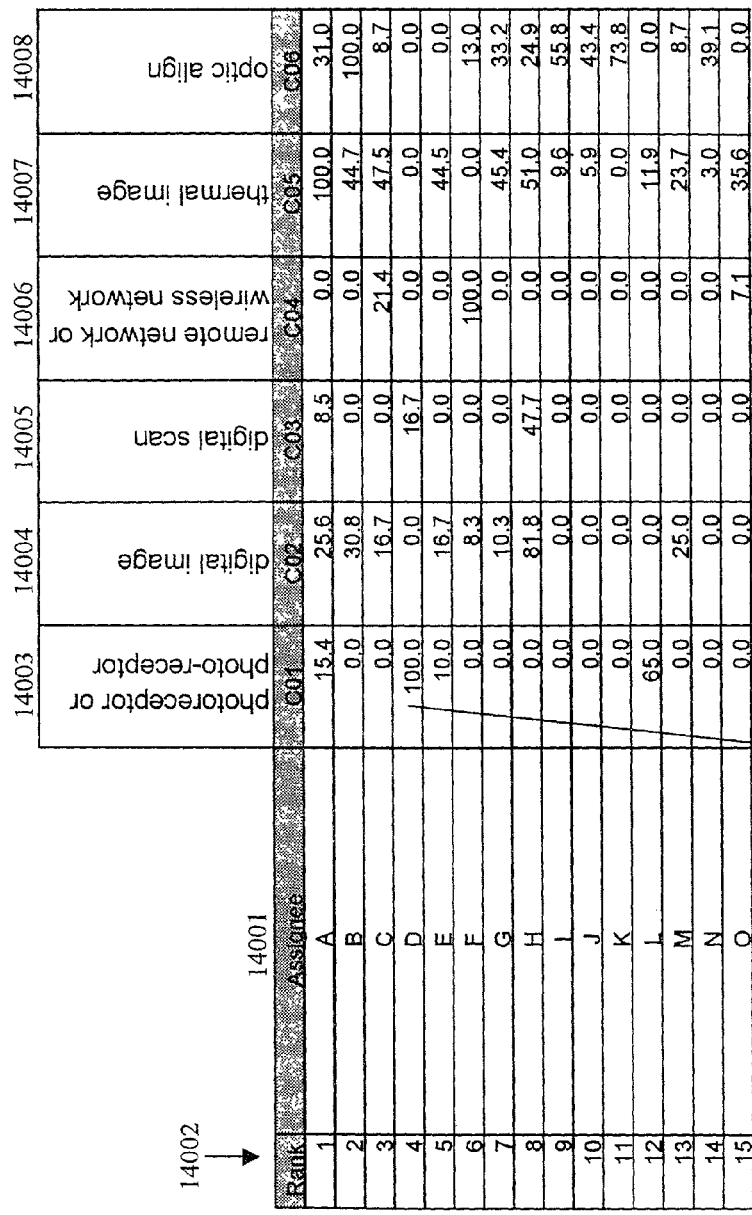
FIG. 15A shows an example of the standardized or normalized Assignee Composite Score (nACS)
Figure 15B:
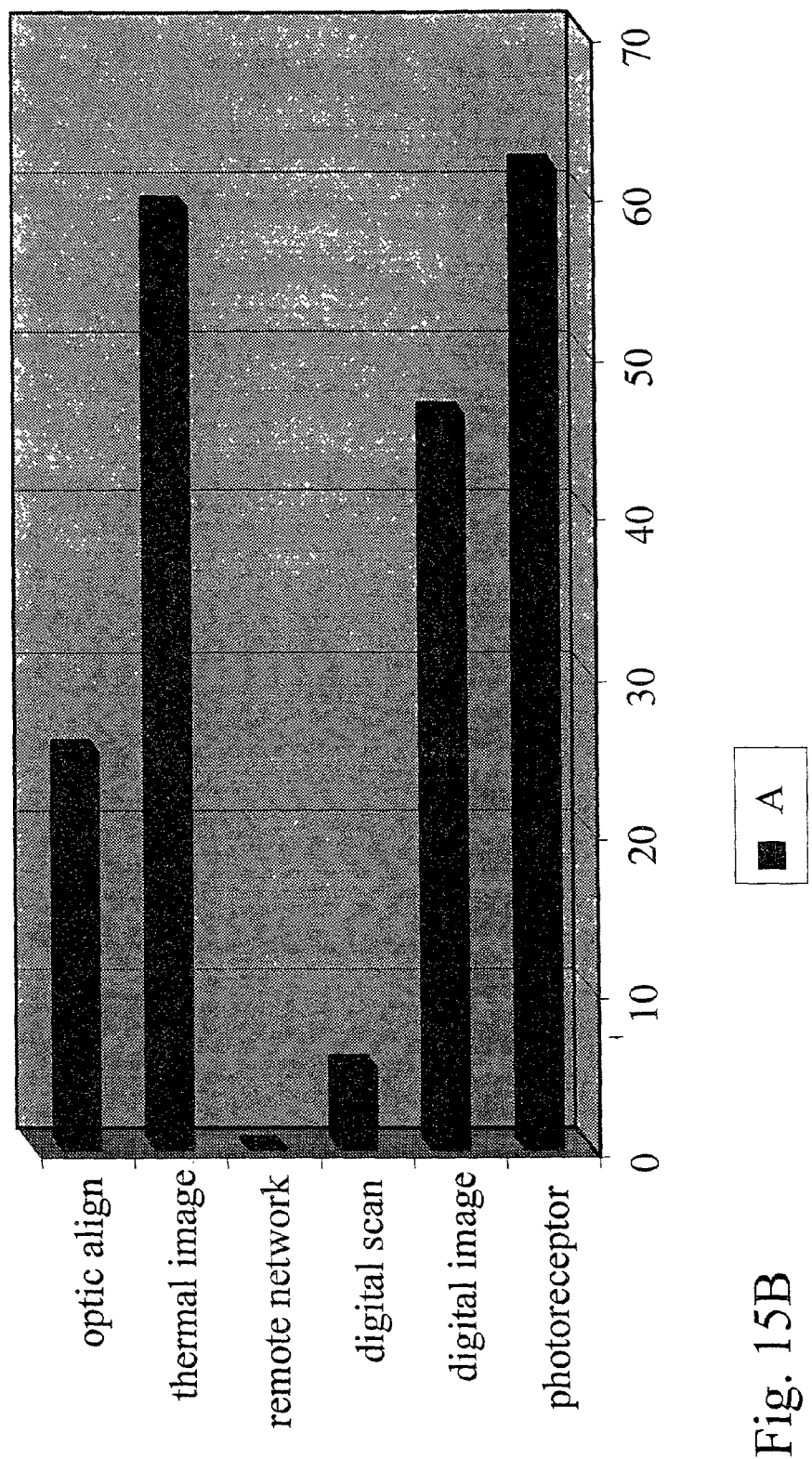
FIGS. 15B-E show the respective normalized Assignee Composite Scores for companies A, D, F, and H where the cells are plotted on the vertical axis, going upward, photoreceptor (photo-receptor), digital image, digital scan, remote network (wireless network), thermal image, and optic align.
Figure 15C:
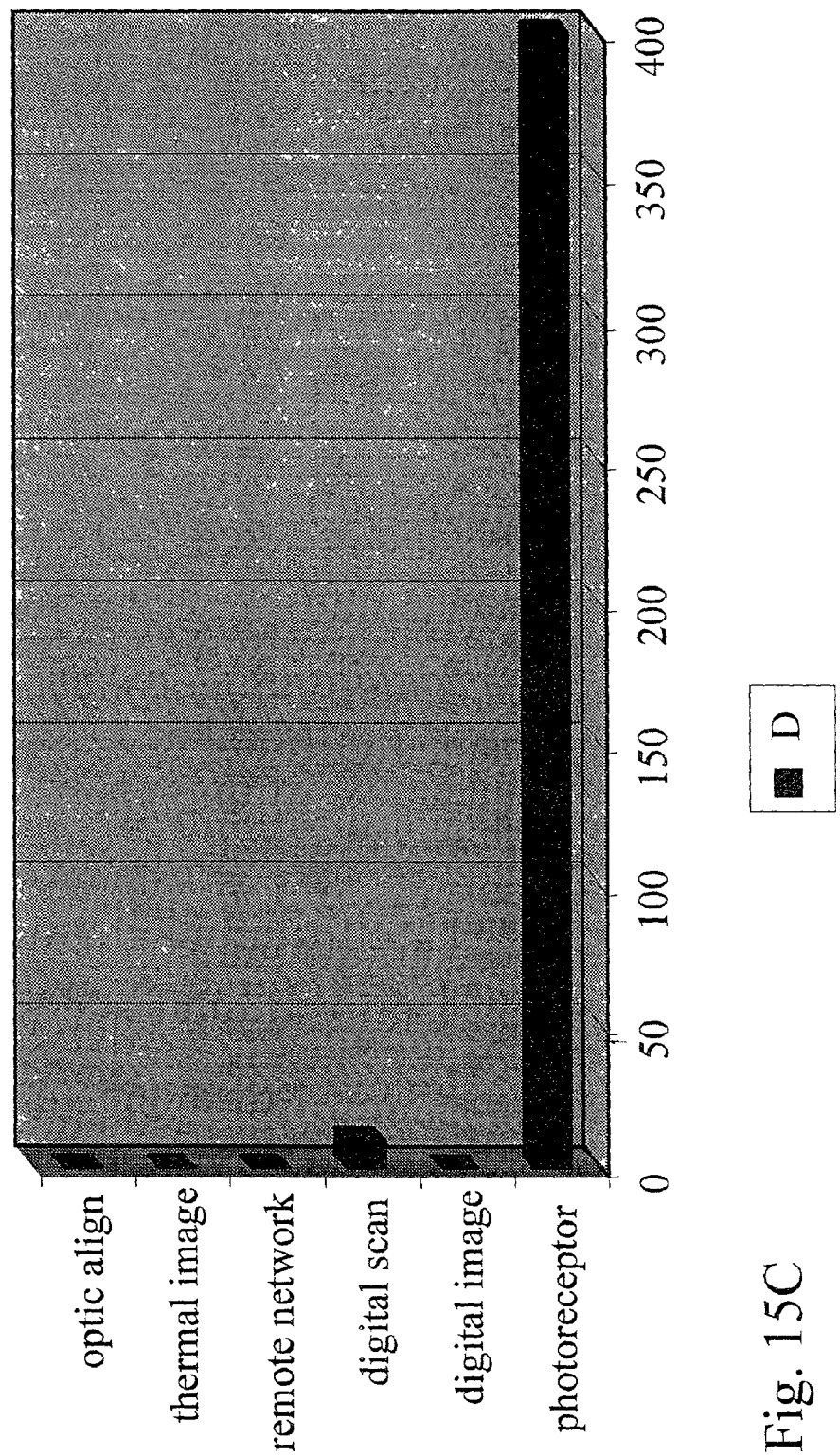
Figure 15D:
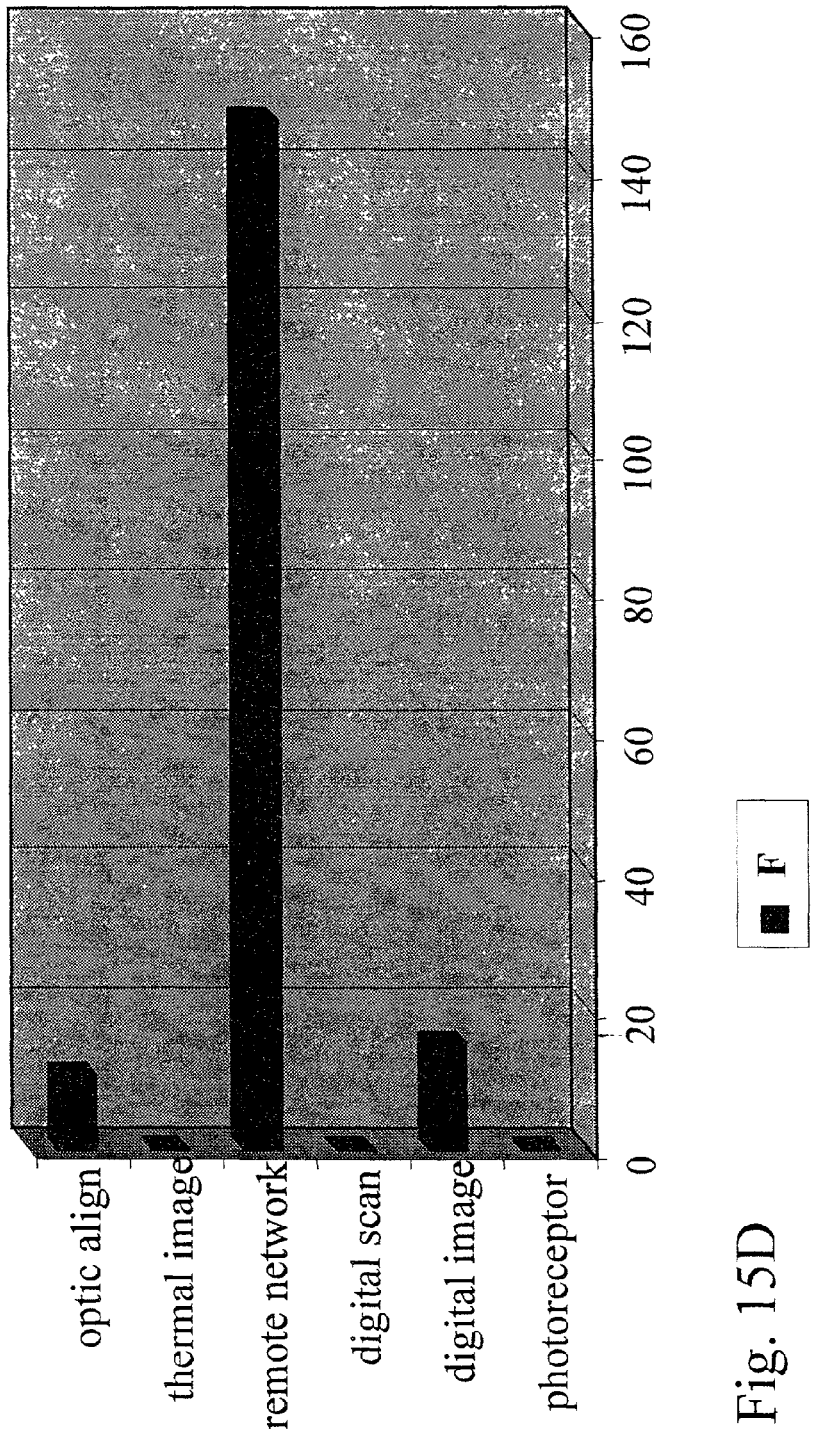
Figure 15E:
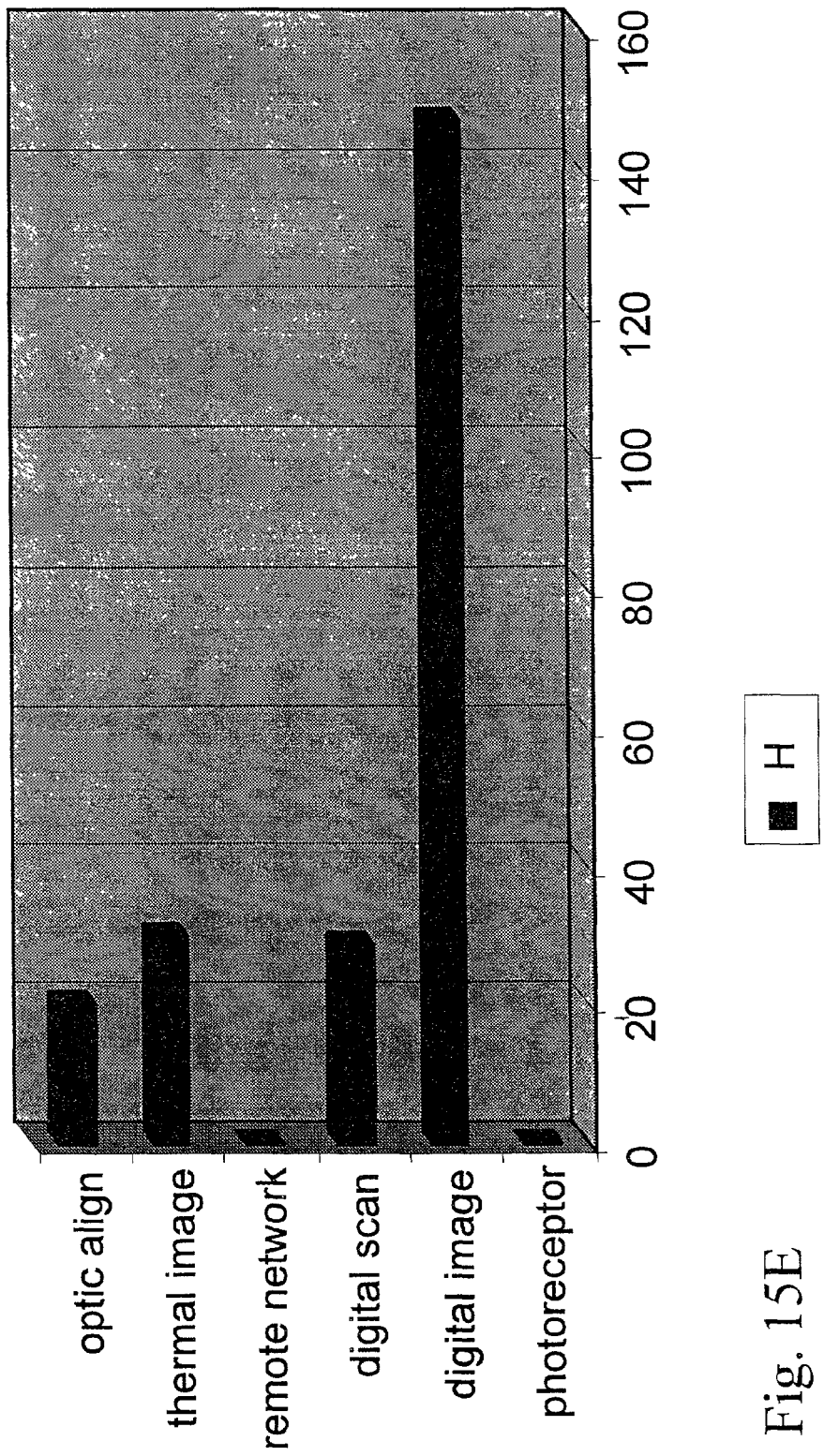

The Assignee Composite Score (ACS) can be normalized to a percentage of the maximum value for all assignees in each cell. That is, in numerical terms, the ACS is calculated to x %, where x ranges from 0 to 100. The assignees per cell are evaluated so that the top assignee tables do not contain the assignee with the maximum value for a given cell. This may be regarded as part of the definition of the Assignee Composite Score (ACS). An example of the normalized Assignee Composite Score (nACS) is shown in FIG. 15A. As before, the actual identity of each has been replaced by capital letters A-O 14001. The rank 14002 is still based on the overall rank as assignee of patents in the field of infrared technology. The normalized Assignee Composite Score (nACS) is shown for the objects, or, sub-areas, of photoreceptor (photo-receptor) 14003, digital image 14004, digital scan 14005, remote network (wireless network) 14006, thermal image 14007, and optic align 14008.

Looking across rank 4, company D in FIG. 14, the raw ACS under the first column, photoreceptor (photoreceptor) 14003 is 400.0 14010. In FIG. 15A, on the other hand, the normalized ACS is 100 15010.

FIGS. 15B-E show the respective normalized Assignee Composite Scores for companies A, D, F, and H. These are plotted on the vertical axis; going upward, photoreceptor (photo-receptor) 14003, digital image 14004, digital scan 14005, remote network (wireless network) 14006, thermal image 14007, and optic align 14008.

Figure 16:
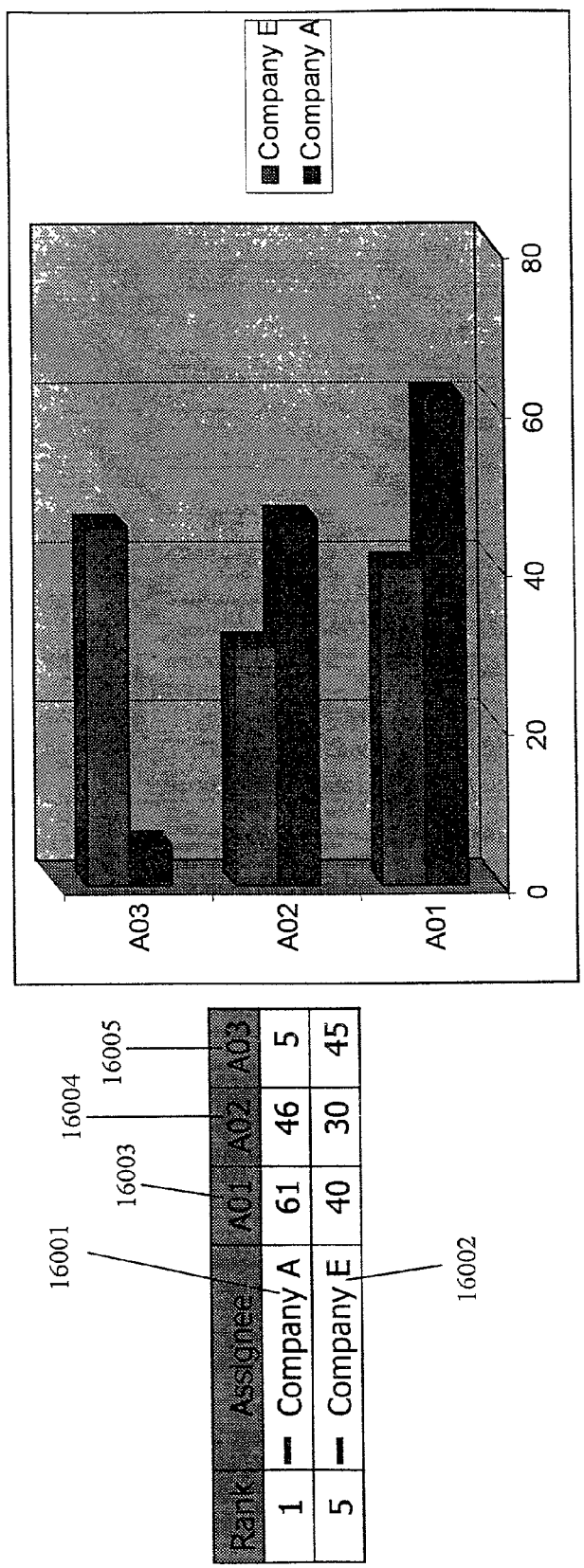
FIG. 16 shows a simple bar graph comparison of company A and company E for three different cells, A01, A02, and A03.
Figure 17:
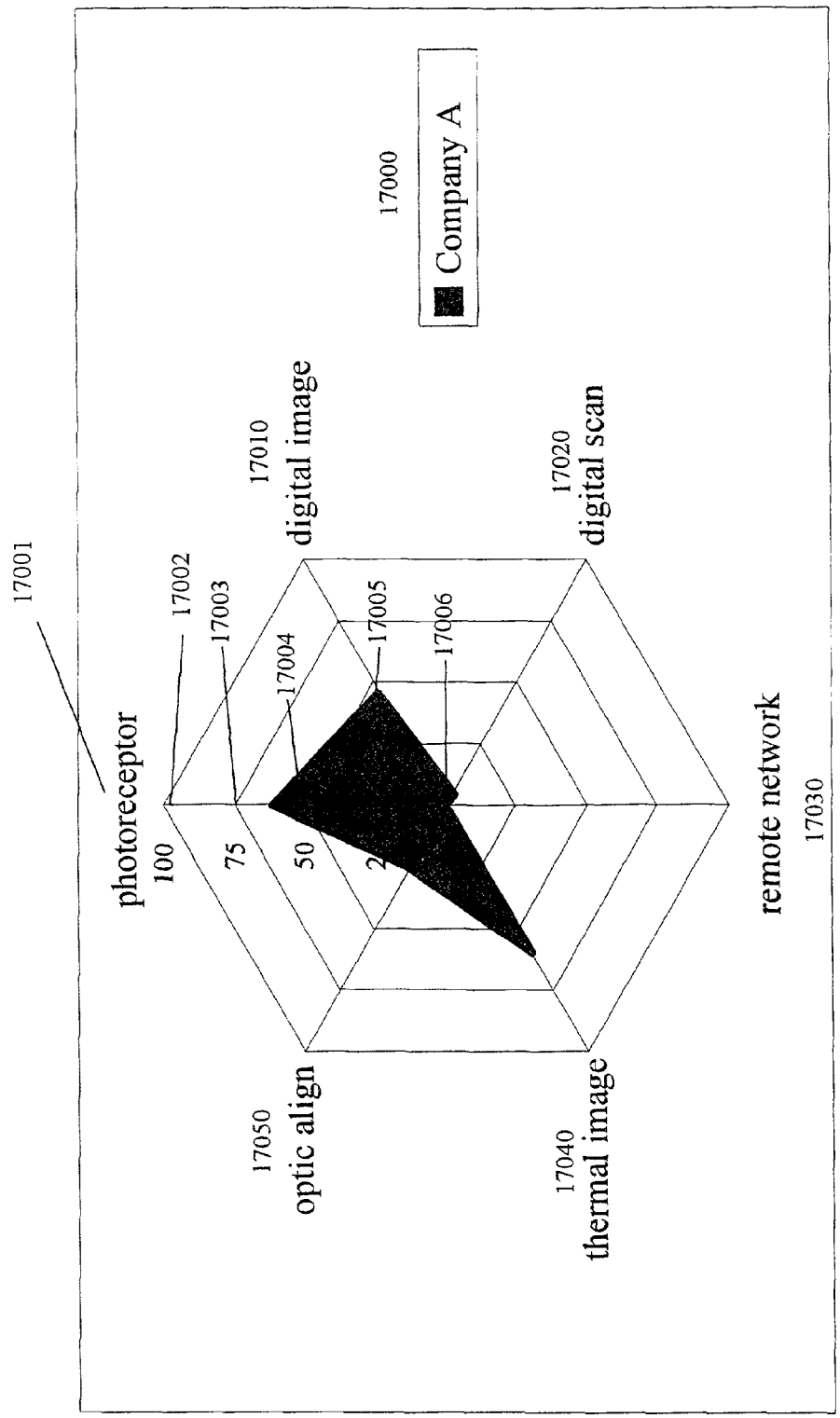
FIG. 17 utilizes "spider diagrams," which are hexagonal or other polygonal figures, to display the normalized Assignee Composite Score of Company A across the cells shown plotted on this hexagonal set of non-orthogonal axes.

FIG. 16 shows a simple bar graph comparison of company A 16001 and company E 16002 for three different cells, A01 16003, A02 16004, and A03 16005. It is one way of comparing the strengths of these two companies in the areas specified by these cells. Another approach (FIG. 17) to the comparison of several companies as, for example, target companies for joint venture, merger or so on, utilizes "spider diagrams" which are hexagonal or other polygonal figures, which denote the normalized Assignee Composite Score (nACS) along six (hexagonal shaped) axes, with zero at the center, and 100 at the outermost limit. For a single company, company A 17000, for example, photoreceptor axis 17001, with indications of nACS at 100 17002, 75 17003, 50 17004, 25 17005 and 0 17006. Other technology axes shown include digital image 17010, digital scan 17020, remote network 17030, thermal image 17040, and optic align 17050.

Figure 18:
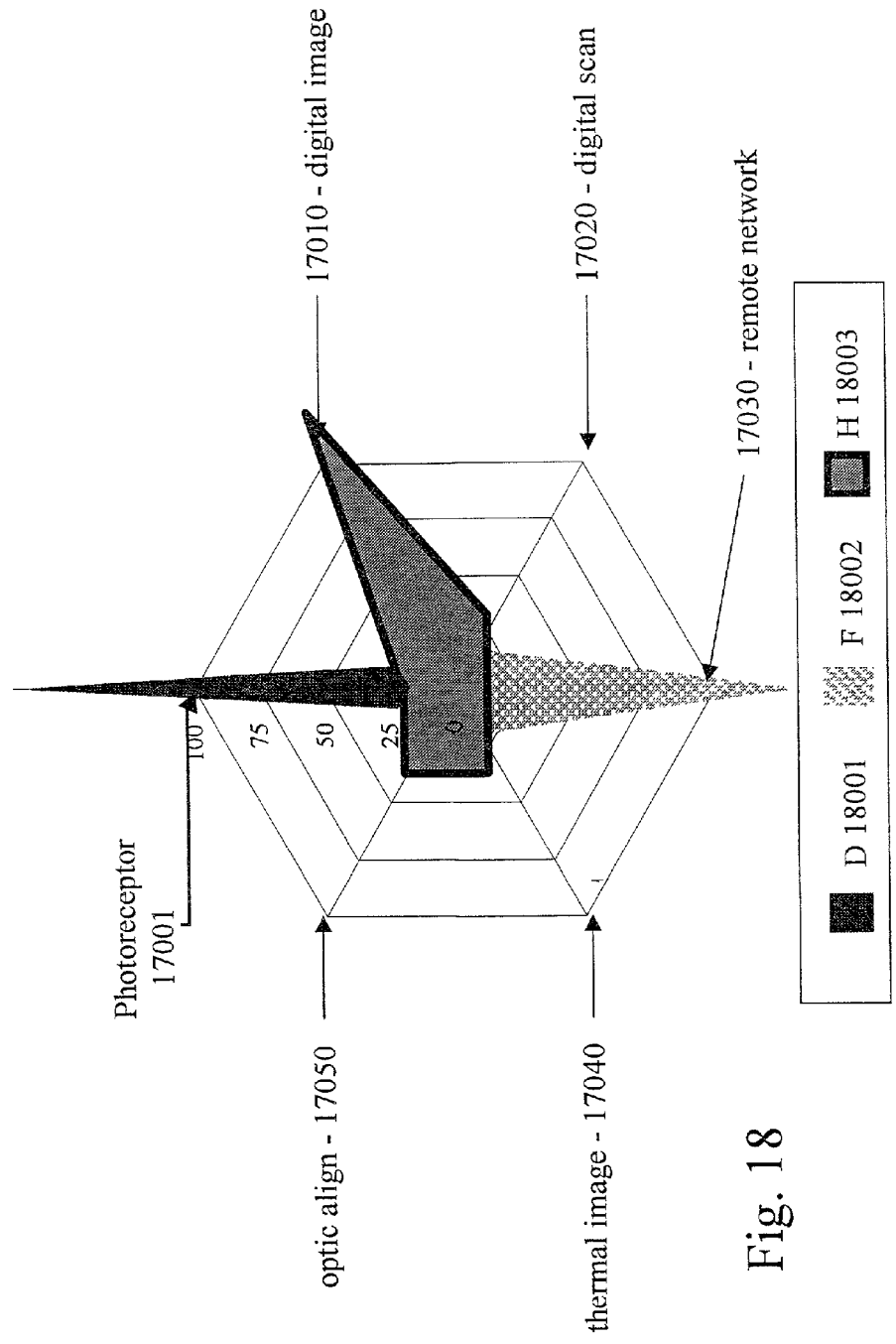
FIG. 18 shows the utilization of the of the spider diagrams in comparing strengths and weaknesses between and among companies, here, company D, company F and company H.

FIG. 18 shows the utilization of the of the spider diagrams in comparing strengths and weaknesses between and among companies. Company D 18001, company F 18002 and company H 18003. Again, the six technology axes, 17001, 17010, 17020, 17030, 17040 and 17050 are shown. Each company's strength can be seen, comparatively. Company D 18001 has a high score along the photoreceptor technology axis 17001. Company F 18002 is particularly strong along the remote network technology axis 17030 while company H has a strong presence along the digital image technology axis 17010. Thus one may compare and contrast the strengths of these three companies in these three technology areas. Advantageously, the comparisons are visual as well as quantitative.

If a company wishes (see FIG. 19) to choose a partner for a joint venture in a technology sector requiring strength first, in thermal imaging 17040 and remote networks 17030, e.g., remote thermal sensors detecting automobile traffic and second, a different joint venture requiring strength in thermal imaging 17030 and digital imaging 17010, e.g., a satellite remote sensing of temperatures. In the first case company A 19001 would like to team with company F 19002. In the second case, company A 19001 would prefer to team with company H 19003.

Figure 20A:
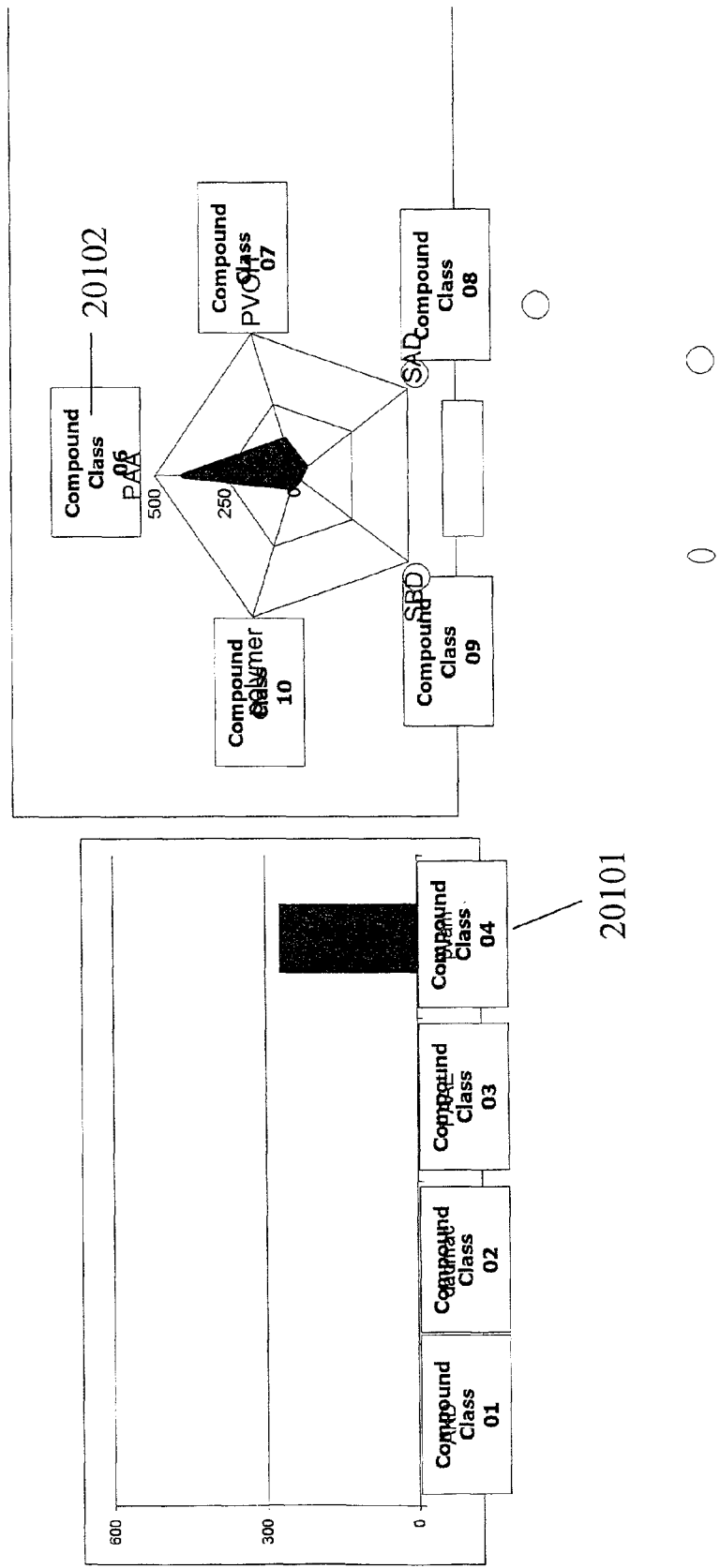
FIG. 20A shows that target partner 1 has strength in compound class 04 as well as 06.
Figure 20B:
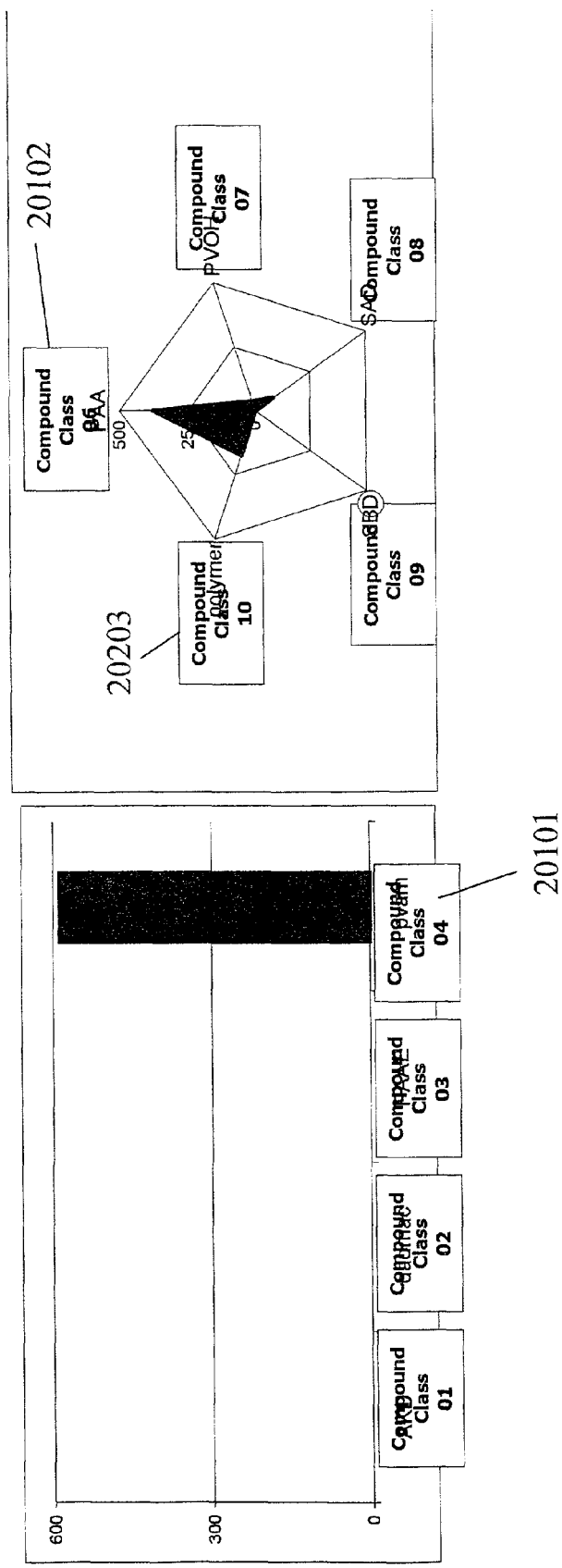
FIG. 20B shows that target partner 2 has more strength than target partner 1 in compound class 04, similar strength to target partner in compound class 06 and more strength than target partner in compound class 10.
Figure 20C:
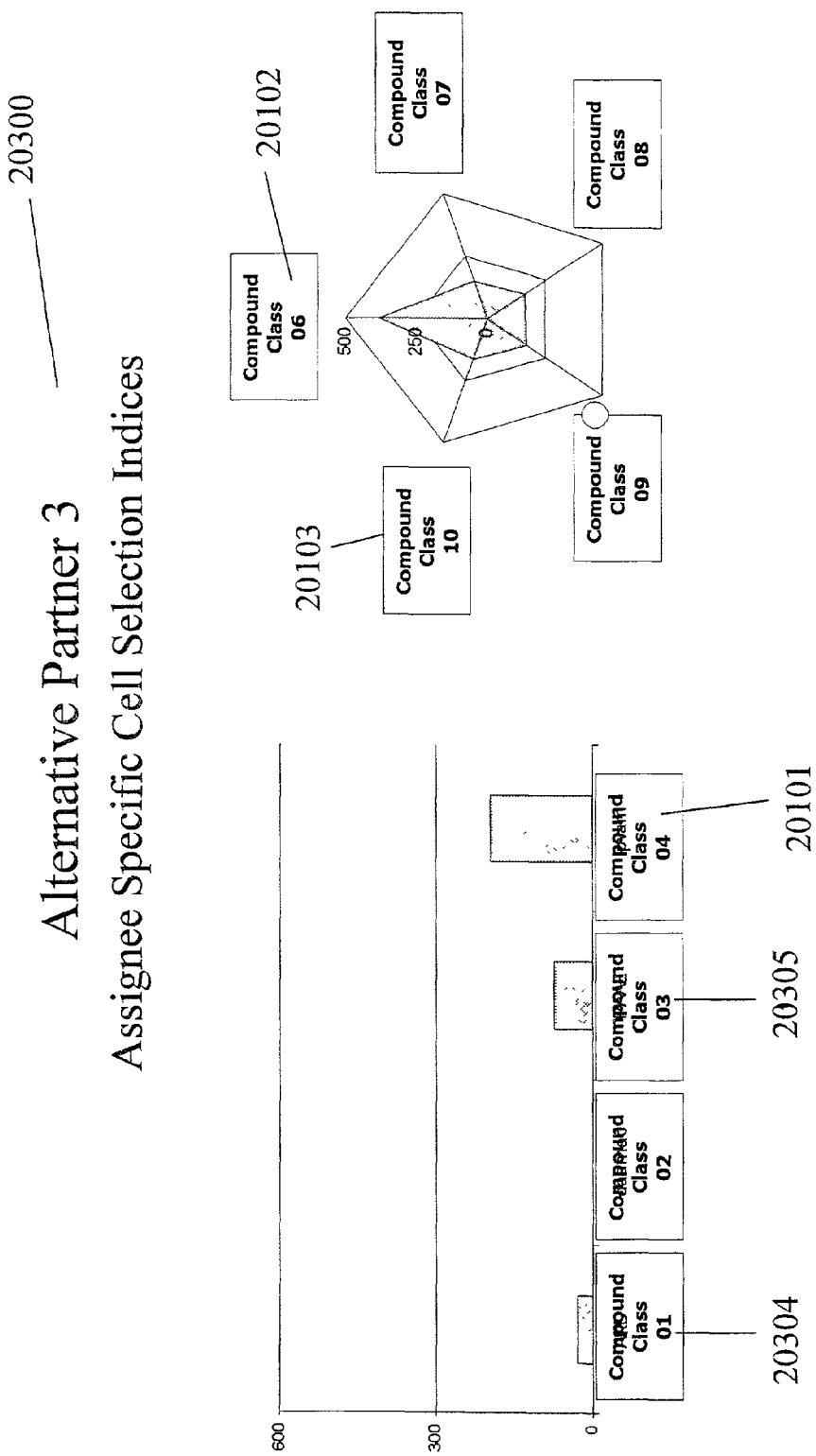
FIG. 20C shows that target partner 3 has slightly less strength in compound class 04 than target partner 1, similar strength to target partner 1 in compound class 06 and compound class 10, and also shows strengths in compound class 01 and compound class 03.

FIGS. 20A-20C show a similar selection of a target alliance partner based on considering alternative partners and their contributions to the partnership according to the assignee-specific cell selection indices. FIG. 20A shows target alliance partner 1 20100 with strengths in compound class 04 20101 as well as 06 20102. Target alliance partner 2 20200 (FIG. 20B) has more strength in compound class 04 20101 (FIG. 20B), similar strength in compound class 06 20102 and some strength in compound class 10 20203.

Target alliance partner 3 20300 (FIG. 20C) has slightly less strength in compound class 04 20101 than target partner 1, similar strength in compound class 06 20102 and compound class 10 20103. Target alliance partner 3 (FIG. 20C), however, also shows strengths in compound class 01 20304 and compound class 03 20305.

The Assignee Field Index (AFI) is an index that scores each Assignee across the entire Technology Field, i.e., all of the cells. The Assignee Field Index (AFI) provides a better understanding an Assignees' competitive position and investment activities in a Technology Field and is an excellent vantage point for identifying established and emerging leaders in Technology Fields. The Assignee Field Index can be derived for all Cells or a selected Cluster of Cells in the Technology Landscape. The Assignee Field Index provides better representation of an Assignees' position by accounting for their Innovation, Dominance, and Breadth in the selected Cells.

The AFI is defined as:

$$AFI = H \cdot PerCentAHP \cdot Aver.$$

where:

$$H = \frac{1}{2} [(\text{An Assignee's Hits/An Assignee's Patents}) + (\text{An Assignee's Recent Hits/An Assignee's Recent Patents})]$$

PerCentAHP=Percentage of Cells where the Assignee Holds at least one Patent
 =(Number of Cells where an Assignee Holds at least one Patent)/(Total Number of Cells in the Technology Field)
Aver.=Average (ACI×CSI) across the Technology Field
 =(Sum of each (ACI for the given Assignee in each cell in the Technology Field X CSI of the respective cell))/ (Total Number of Cells in the Technology Field)

A standardized Assignee Field Index is defined as:

Standardized Assignee Field Index=$AFI$·Standardizing Factor where:

Standardizing Factor=100/Max($AFI$)

where Max(AFI) is the maximum occurring AFI so that all the AFI's are normalized to the maximum AFI, or, the Standardizing Factor=1 for AFI=Max(AFI).

Figure 21:
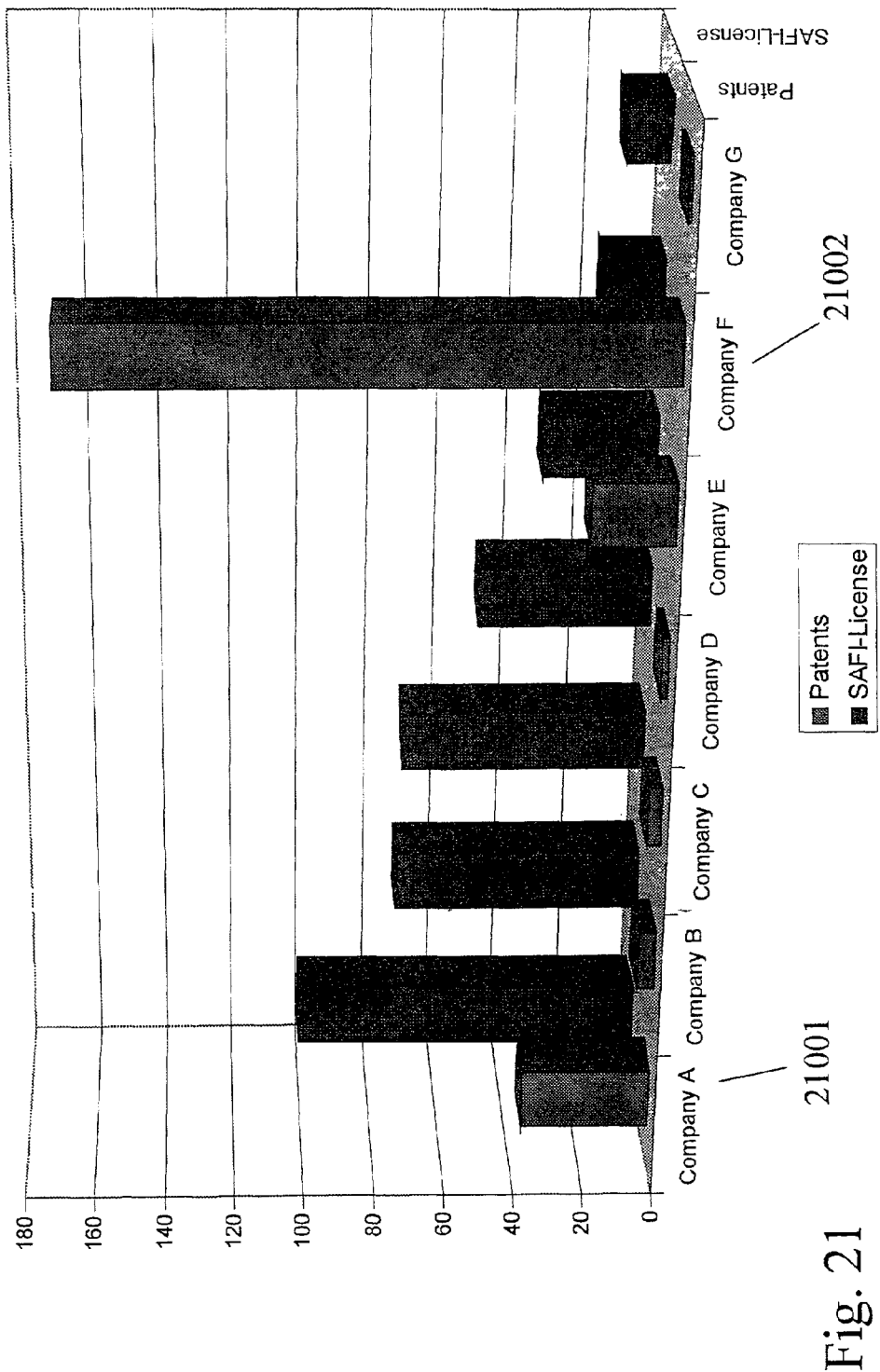
FIG. 21 shows company A ranks first, based on the AFI, while company F ranks first based on number of patents.

Assignee Field Index helps identify assignees of potential interest even when the patent holdings are relatively limited. In FIG. 21, based on the AFI, company A 21001 ranks first while company F 21002 ranks first based on number of patents.

The Assignee Cell Index (ACI) is an index that is similar to the CSI (Cell Selection Index) but gives each assignee a score in each cell. The Assignee Cell Index (ACI) is derived for all Assignees for each Cell based on attributed patents and literature from their Dominance and Innovation in the specific Cell. The Assignee Cell Index accounts for patent life and changes in a given assignee's Innovation in a Cell. As a result, the Assignee Cell Index reflects which Cells an assignee is pursuing and its position relative to other assignees in a particular Cell, thereby identifying future opportunities.

As an example we contrast two companies. Company A may have a high dominance, based on research yielding a large number of patents but with declining activity over the past 10 years. Company B may have far fewer patents, however these patents may have been published with increasing activity in the last few years. The Assignee Cell Index adjusts Dominance with Innovation and would suggest that Company B is the leader with respect to Opportunities in a Cell.

Assignee Cell Index=ACI

The ACI is defined as:

$ACI = \frac{1}{2}\{AvPCPinCell + AvPCRPinCell\} \cdot [(ACIsI + 100) + (ACAppI + 100)]/200 \cdot 1000$ where:
AvPCPinCell=Percentage of Patents in a Cell held by an Assignee
AvPCRPinCell=Percentage of Recent Patents in a Cell held by an Assignee)
and where:
Percentage of Patents in a Cell held by an Assignee=(An Assignee's Patents in a Cell/Total Patents in a Cell)
Percentage of Recent Patents in a Cell held by an Assignee=(An Assignee's Recent Patents in a Cell/Total Recent Patents in a Cell)
and where:
ACIsI=Assignee Cell Issued Innovation
ACAppI=Assignee Cell Applied Innovation
where:
Assignee Cell Issued Innovation and Assignee Cell Applied Innovation are for each Assignee (using ACIsI when calculating for Issued Patents and ACAppI when calculating for applied (for) patents):

$ACIs(App)I = (1/21)\{[A-B]/B \cdot 6 + [B-C]/C \cdot 5 + [C-D]/D \cdot 4 + [D-E]/E \cdot 3 + [E-F]/F \cdot 2 + [F-G]/G \cdot 1\}$ where:
A=the number of patents issued (applied) within one year of the last patent issued in the data set; B=the number of patents issued (applied) more than one year but less than two years prior to the issuing of last patent in the data years set; C=the number of patents issued (applied) more than two years but less than three years prior to the issuing of last patent in the data set; D=the number of patents issued (applied) more than three years but less than four years prior to the issuing of last patent in the data set; E=the number of patents issued (applied) more than four years but less than five years prior to the issuing of last patent in the data set; F=the number of patents issued (applied) more than five years but less than six years prior to the issuing of last patent in the data set; G=the number of patents issued (applied) more than six years but less than seven years prior to the issuing of last patent in the data set.

SACI=Standardized Assignee Cell Index=$ACI$·Standardizing Factor where:

the Standardizing Factor=100/Max ($ACI$).

Figure 22:
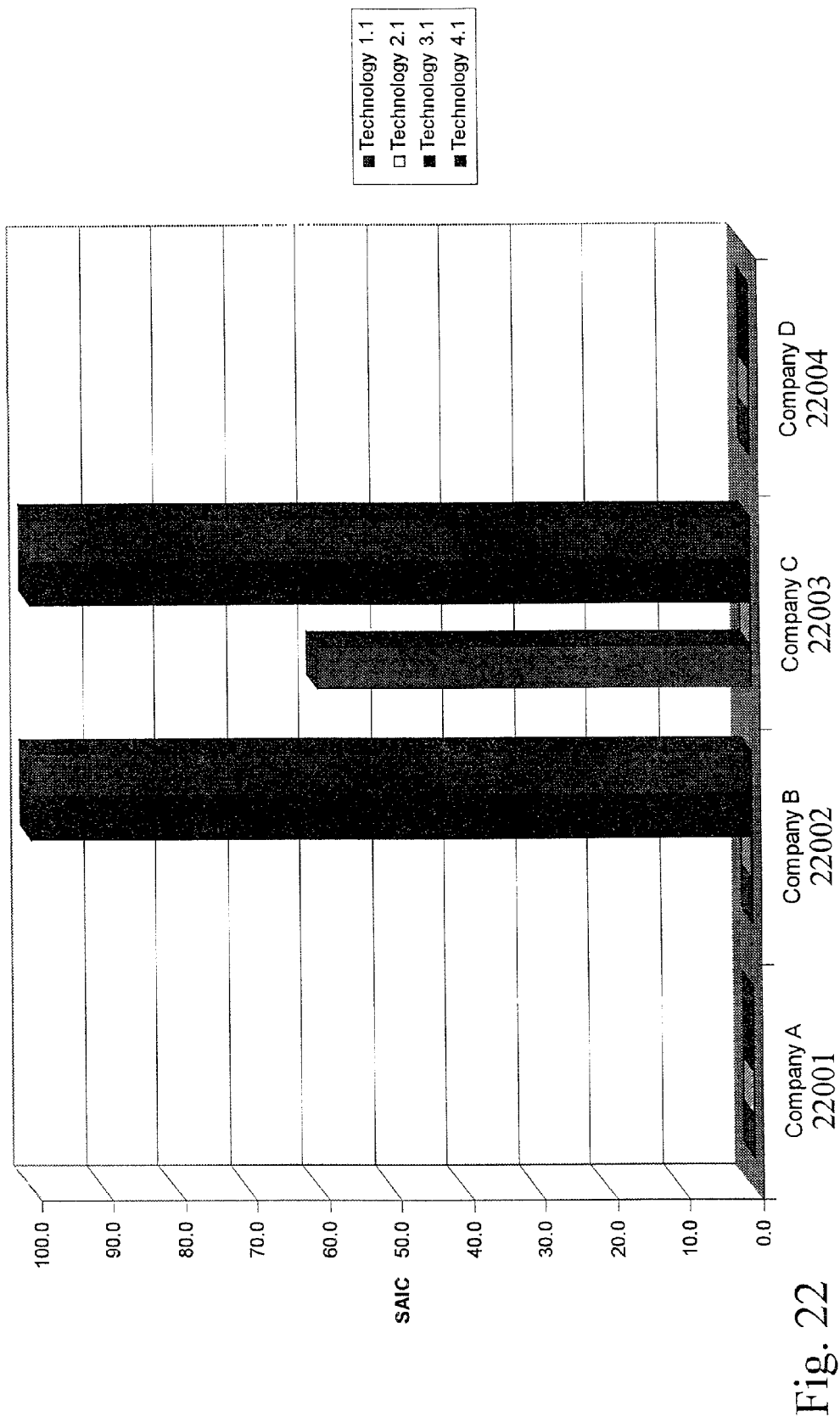
FIG. 22 shows a comparison among companies A, B, C and D based on the Standardized Assignee Cell Index (sACI) across technologies 1.1, 2.1, 3.1, and 4.1.
Figure 23:
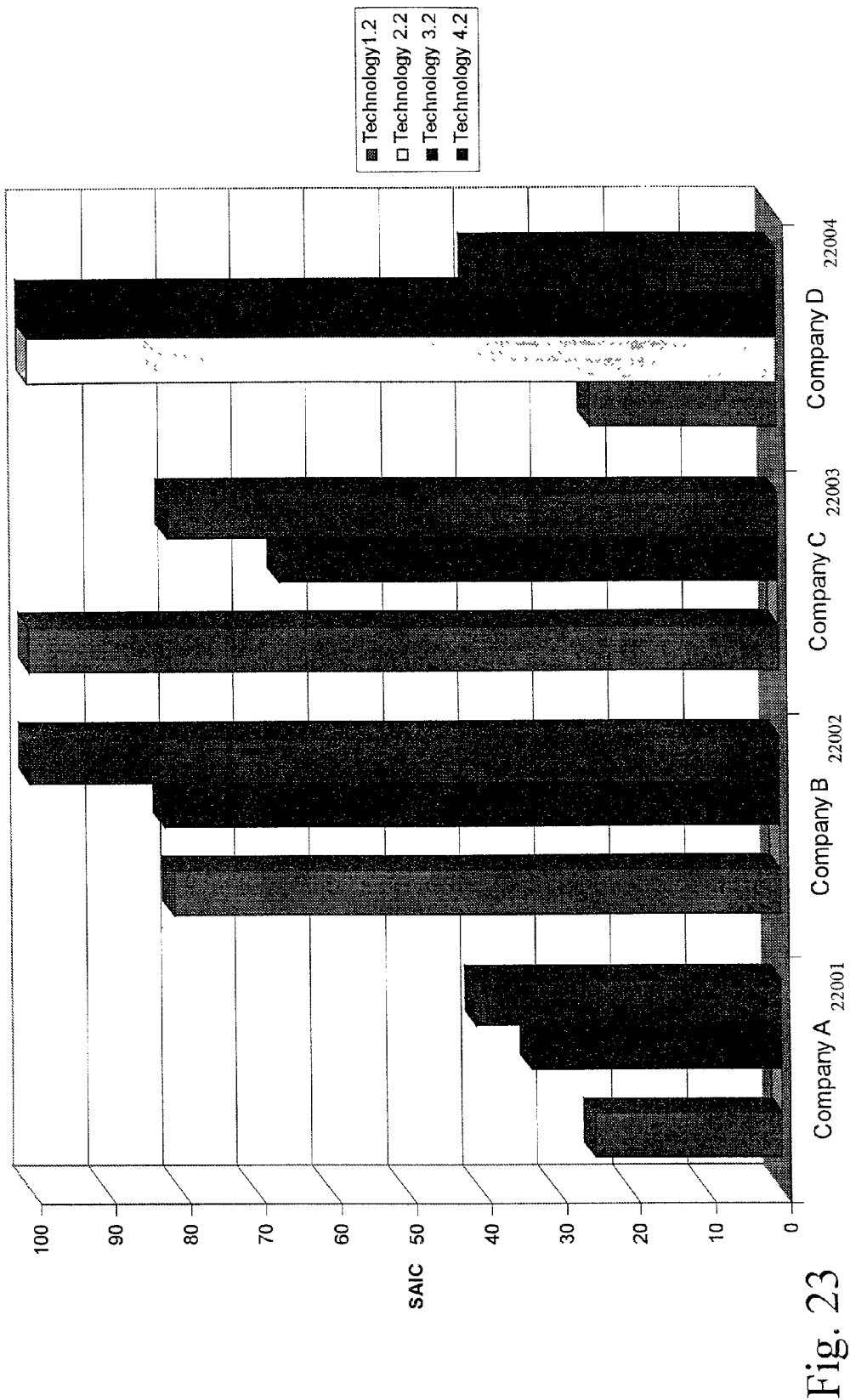
FIG. 23 shows a similar comparison but across technologies 1.2, 2.2, 3.2, and 4.2.
Figure 24:
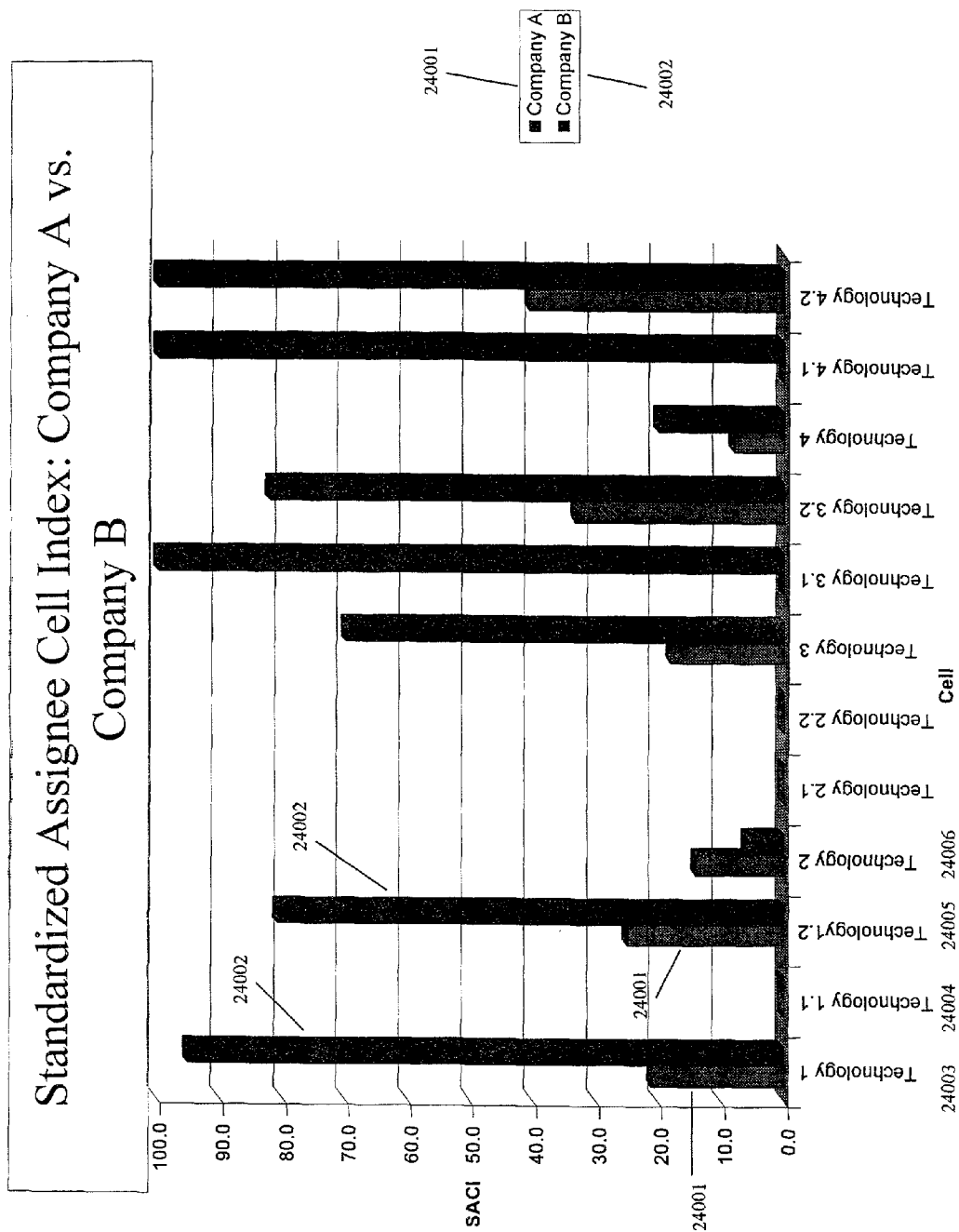

FIG. 22 shows a comparison among companies A 22001, B 22002, C 22003 and D 22004 based on the Standardized Assignee Cell Index (sACI) across technologies 1.1, 2.1, 3.1, and 4.1 while FIG. 23 shows a similar comparison but across technologies 1.2, 2.2, 3.2, and 4.2. FIG. 24 shows the comparison, based on the sACI, of company A 24001 and company B 24002 for a number of technologies, technology 1.0 24003, technology 1.1 24004, technology 1.2 24005, technology 2 24006, and so on.

Figure 25A:
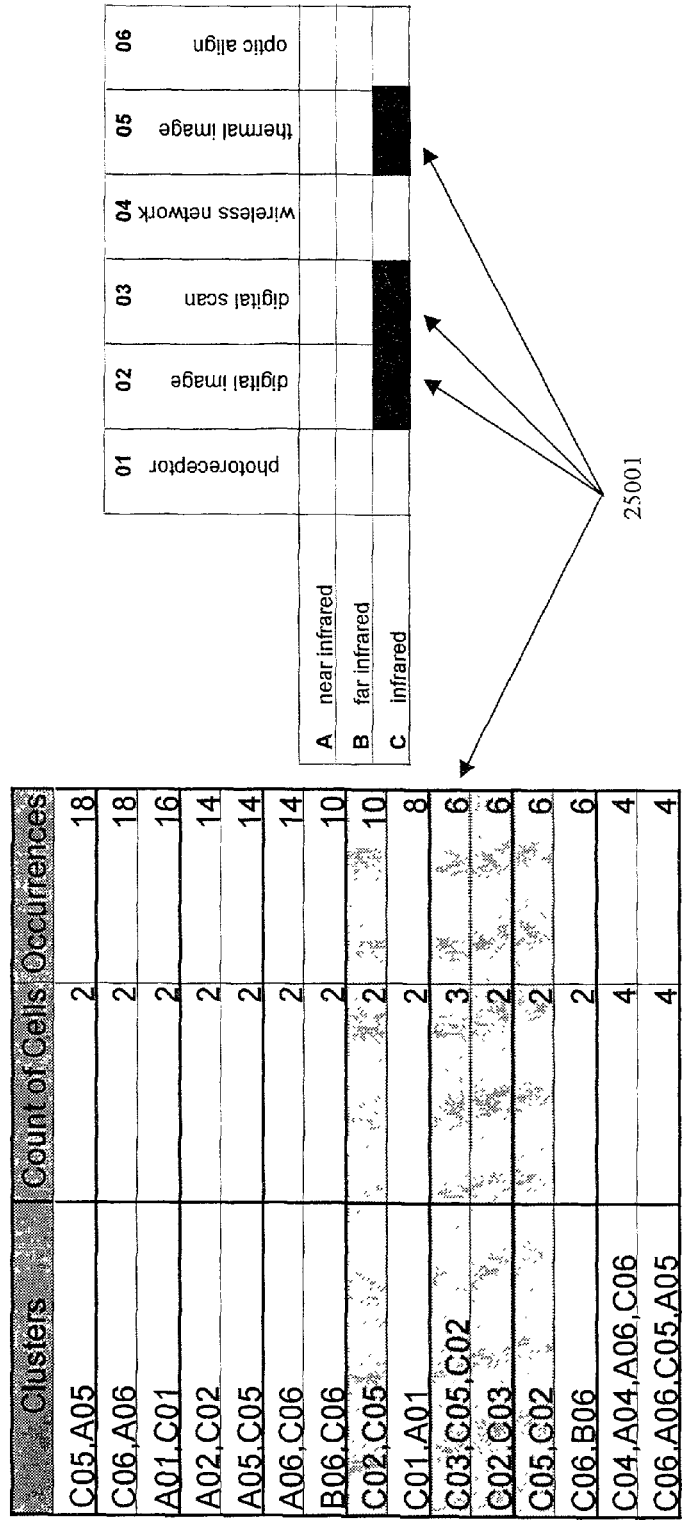
FIG. 25A shows a naturally occurring cluster where individual patents fall across multiple cells, here 6 patents falling in the cells C02, C03, and C05.

A cluster 5002 (FIG. 5) is a group of related cells, such as a column 4081 (FIG. 4) or a row 4082 (FIG. 4). Cells may be related because it has turned out that a number of the same patents turn up in each cell of the cluster 25001. See FIG. 25A. These clusters 25001 are "naturally" related, in that they are a byproduct of part of the analysis procedure. The natural clusters fall-out from the construction of the technology Field. In addition to naturally occurring clusters, any cluster can be defined whereas MTFA can be applied. A cluster of cells can be formed as desired by a client who wants to group specific cells. A cluster Assignee Field Index can be calculated for a cluster or a set of clusters. It is calculated according to the Assignee Field Index, but only with those patents from the cluster, or set of clusters. The top assignees across a selected cluster can be broken out into a report. See FIG. 25B.

Individual top inventors may also be selected out by various criteria, for example, by a technology area, or by assignee company, and listed as an output report. Typically, the "top" inventors are selected out by having the greater number of patents for an assignee or technology area. The user can input specific inventors as the user deems advisable, also. See FIG. 26. Knowledge of top inventors made be used in selecting a patent to derive search terms from, as described above, since a top inventor's patent may be most relevant for locating other pertinent patents.

Figure 27:
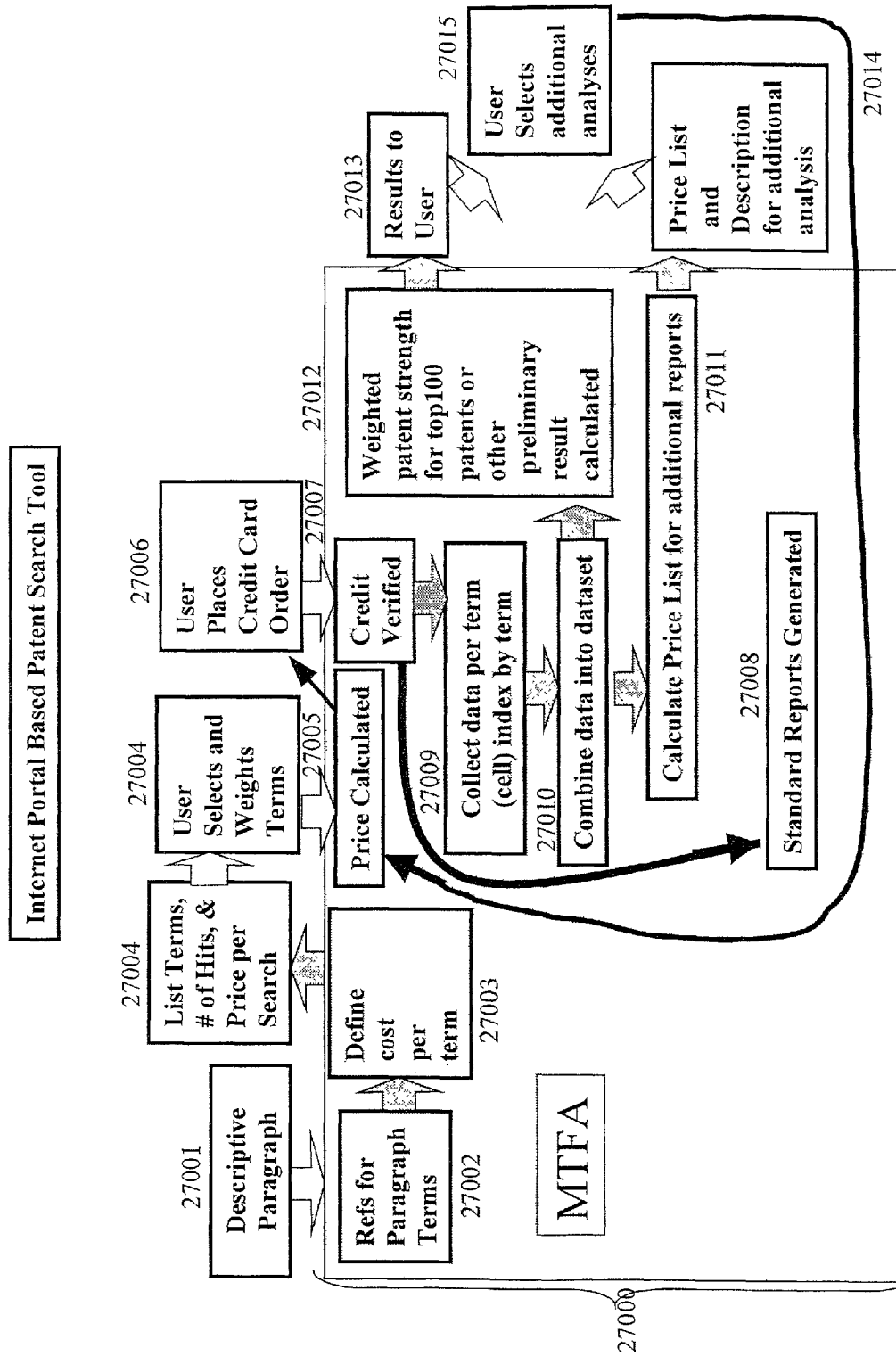
FIG. 27 shows an Internet based version, specialized to the patent area, of an originally general operator system algorithm with recursion, feedback, axioms-of-application-area, and client-particular rules.

An Internet based version, specialized to the patent area, of an originally general operator system algorithm with recursion, feedback, axioms-of-application-area, and client-particular rules is shown in FIG. 27. The client enters a descriptive paragraph 27001 over the Internet and then a module of an Internet version of the MTFA 27000 then finds references for paragraph terms 27002. Next a module of this I-MTFA (Internet version of MTFA) defines the cost per term 27003. A list of terms, number of hits and price per search is sent to the client 27004. The client selects and weights search terms 27004. An I-MTFA module calculates the price 27005. If the client wishes to proceed, the client places a credit card 27006, or other acceptable method, e.g., an open, or a prepaid, account with I-MTFA. I-MTFA verifies the validity of the credit requested 27007. Standard reports are generated

27008. Other calculations include: collect data per term (cell) index by term 27009, combine data into data set 27010, calculate price list for additional reports 27011, weighted patent strength for top 100 patents or other preliminary results calculated 27012, the results of this last calculation offered to the client 27013 along with a price list and description for additional analyses 27014. As the client selects additional analyses 27015, the cycle returns to price calculated 27005 and so on.

Figure 28:
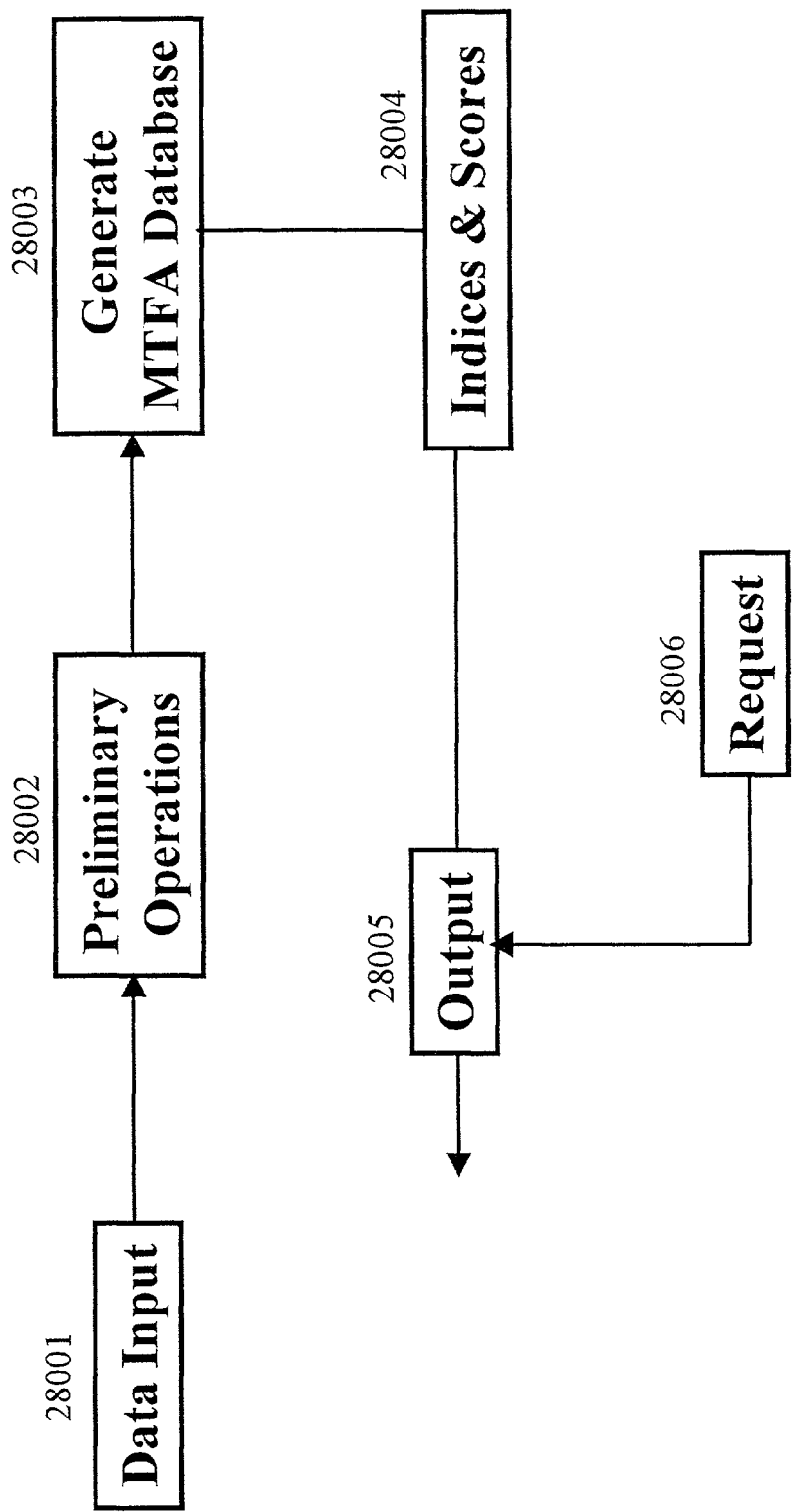
FIG. 28 depicts a generalized summary flow diagram for the Multi-Term Frequency Analysis.

FIG. 28 depicts a generalized summary flow diagram for the Multi-Term Frequency Analysis. There is an initial DATA INPUT 28001. PRELIMINARY OPERATIONS 28002 on input data deal with such matters as assigning an I.D. (identification) to a field, defining cells within that field, collecting data for each cell, assigning an I.D. for each cell, importing data into the MTFA field database, defining an I.D. for unique datum across cells. Next is GENERATE MTFA DATABASE 28003.

It is important to note that in all calculations below and in all definitions above, the domains, in a mathematical sense, to which the formulas, as defined and examples as calculated, do not limit the application of these formulae and examples to the domains expressly shown. The domains may include items in cells, clusters, or a landscape, and also items which may not necessarily be patents, or aspects associated with patents. The particular embodiments shown, as formulae, or, examples, or otherwise shown are meant to be illustrative and not limiting in any way of the application of embodiments of the invention.

The next items are calculations of the various indices and scores INDICES & SCORES 28004 (detailed above). Then plots, diagrams and figures are generated, as OUTPUT 28005, as requested by a client, REQUEST 28006.

Example 1

Cell Indices and the Cell Selection Index Sample Calculation

The following details the calculation of indices and the Cell Selection Index for cell C01, (FIG. 8, 8027; FIG. 13A, 13041).

> Dominance=Number of Patents held by the Top 10% Assignees/Total number of patents, in a given cell.

> Dominance=30/62=0.4839 where:

Top 10% Assignees=Number of Assignees (sorted by patent count) holding a patent in a given cell×0.1;

For example, the Dominance for Cell C01 is 0.484. The following describes the calculation:

28 Assignees hold patents in Cell C01.

10% of 28=28×0.1=2.8, which rounds up to 3. Thus, the Top 10% Assignees are the 3 top patent holders in Cell C01, Company A (17), Company B (9), and Company C (4). Sum up these three Assignees' patent holdings: 17+9+4=30=Number of Patents held by the Top 10% Assignees.

Divide the above number by the total number of patents in Cell C01, 62.

Dominance for Cell C01=30/62=0.484

> Recent Dominance=Number of Recent Patents held by the Top 10% Recent Assignees/Total number of recent patents, in a given cell.

> Recent Dominance=7/16=0.438 where:

Top 10% Recent Assignees=Number of Recent Assignees (sorted by recent patent count) holding a recent patent in a given cell×0.1;

For example, the Recent Dominance for Cell C01 is 0.438. The following describes the calculation:

11 Assignees hold recent patents in Cell C01.

10% of 11=11×0.1=1.1, which rounds up to 2. Thus, the Top 10% Assignees are the 2 top recent patent holders in Cell C01, Company B (4), and Company A (3).

Sum up these Recent Assignees' patent holdings: 4+3=7=Number of Patents held by the Top 10% Recent Assignees.

Divide the above number by the total number of recent patents in Cell C01, 16.

Dominance for Cell C01=7/16=0.438

> Issued (Applied) Innovation=$(1/21)\{[A-B]/B\cdot 6+[B-C]/C\cdot 5+[C-D]/D\cdot 4+[D-E]/E\cdot 3+[E-F]/F\cdot 2+[F-G]/G\cdot 1\}$ For example, the Issued Innovation for Cell C01 is 0.333. The following describes the calculation:

> Issued Innovation for Cell C01=$(1/21)\{[8-6]/6\cdot 6+[6-4]/4\cdot 5+[4-5]/5\cdot 4+[5-2]/2\cdot 3+[2-5]/5\cdot 2+[5\cdot 5]/5\cdot 1\}=7/21=0.333$ where:

A=8; in Cell C01, the number of patents issued within one year of the last patent issued in the data set; B=6; in Cell C01, the number of patents issued more than one year but less than two years prior to the issuing of last patent in the data set; C=4; in Cell C01, the number of patents issued more than two years but less than three years prior to the issuing of last patent in the data set; D=5; in Cell C01, the number of patents issued more than three years but less than four years prior to the issuing of last patent in the data set; E=2; in Cell C01; the number of patents issued more than four years but less than five years prior to the issuing of last patent in the data set; F=5; in Cell C01, the number of patents issued more than five years but less than six years prior to the issuing of last patent in the data set; G=5; in Cell C01, the number of patents issued more than six years but less than seven years prior to the issuing of last patent in the data set.

For example, the Applied Innovation for Cell C01 is 0.643. The following describes the calculation:

> Applied Innovation for Cell C01=$(1/21)\{[2-0]/0\cdot 6+[0-2]/2\cdot 5+[2-1]/1\cdot 4+[1-1]/1\cdot 3+[1-4]/4\cdot 2+[4-0]/0\cdot 1\}=13.5/21=0.643$

[Note: when the denominator is zero, the zero is defaulted to 1 to make the calculation possible. For example, from above, (A−B)/B is (2−0)/0, but we default it to be (2−0)/1.]

where:

A=2; in Cell C01, the number of patents applied within one year of the last patent issued in the data set; B=0; in Cell C01, the number of patents applied more than one year but less than two years prior to the issuing of last patent in the data set; C=2; in Cell C01, the number of patents applied more than two years but less than three years prior to the issuing of last patent in the data set; D=1; in Cell C01, the number of patents applied more than three years but less than four years prior to the issuing of last patent in the data set; E=1; in Cell C01, the number of patents applied more than four years but less than five years prior to the issuing of last patent in the data set;

F=4; in Cell C01, the number of patents applied more than five years but less than six years prior to the issuing of last patent in the data set; G=0; in Cell C01, the number of patents applied more than six years but less than seven years prior to the issuing of last patent in the data set Predictive Innovation=Applied Innovation−Issued Innovation For Cell C01, Predictive Innovation=(13.5/21)−(7/21)=0.310
Develop License $CSI=(AvDom)\cdot(AvInn)\cdot(PredInn)$;

where:
AvDom=½ (dominance develop quartile+recent dominance develop quartile);
AvInn=½ (issued innovation quartile+applied innovation quartile);
PredInn=predictive innovation quartile.

To define the develop quartiles, take the range between the max and min of the respective index across the Technology Field and divide it into 4 quartiles.

For example, in the Infrared Technology Field, the maximum value for the dominance index is 1.0 while the minimum value is 0.2. Thus, the dominance develop quartiles are defined as:
Quartile 4: 0.2−0.4
Quartile 3: 0.4−0.6
Quartile 2: 0.6−0.8
Quartile 1: 0.8−1.0

[Note: quartile 4 has the lowest dominance values for calculation of the develop CSI, consistent with MTFA's assumption that less dominated cells are better suited for development.]
Cell C01 Dominance=0.484 which falls into Quartile 3; thus, dominance develop quartile=3.

The maximum value for the recent dominance index is 1.0 while the minimum value is 0.0. Thus, the recent dominance develop quartiles are defined as:
Quartile 4: 0.0−0.25
Quartile 3: 0.25−0.50
Quartile 2: 0.50−0.75
Quartile 1: 0.75−1.0

[Note: quartile 4 has the lowest dominance values for calculation of the develop CSI, consistent with MTFA's assumption that less dominated cells are better suited for development.]
Cell C01 Recent Dominance=0.438 which falls into Quartile 3; thus, recent dominance develop quartile=3.
AvDom=½ (dominance develop quartile+recent dominance develop quartile)
AvDom=½ (3+3)=3

The maximum value for the issued innovation index is 1.294 while the minimum value is −0.262 [Note: when the minimum value falls below zero, it is defaulted to zero as negative innovation has the same implication as zero innovation]. Thus, the issued innovation quartiles are defined as:
Quartile 1: 0.0−0.323
Quartile 2: 0.323−0.647
Quartile 3: 0.647−0.970
Quartile 4: 0.970−1.294
Cell C01 Issued Innovation=0.333 which falls into Quartile 2; thus, issued innovation quartile=2.

[Note: Innovation quartiles are the same for the develop CSI and license CSI]
The maximum value for the applied innovation index is 0.869 while the minimum value is −0.143 [Note: when the minimum value falls below zero, it is defaulted to zero as negative innovation has the same implication as zero innovation]. Thus, the applied innovation quartiles are defined as:
Quartile 1: 0.0−0.217
Quartile 2: 0.217−0.435
Quartile 3: 0.435−0.652
Quartile 4: 0.652−0.869
Cell C01 Applied Innovation=0.643 which falls into Quartile 3; applied innovation quartile=3.

[Note: Innovation quartiles are the same for the develop CSI and license CSI]
AvInn=½ (issued innovation quartile+applied innovation quartile)
AvInn=½ (2+3)=2.5

The maximum value for the predictive innovation index is 0.5 while the minimum value is −0.794 [Note: when the minimum value falls below zero, it is defaulted to zero as negative innovation has the same implication as zero innovation]. Thus, the predictive innovation quartiles are defined as:
Quartile 1: 0.0−0.125
Quartile 2: 0.125−0.250
Quartile 3: 0.250−0.375
Quartile 4: 0.375−0.5
Cell C01 Predictive Innovation=0.310 which falls into Quartile 3; thus, predictive innovation quartile=3.

[Note: Innovation quartiles are the same for the develop CSI and license CSI]
PredInn=3
Using the calculations from above,
Develop CSI=(AvDom)·(AvInn)·(PredInn);
for Cell C01, Develop CSI=3·2.5·3=22.5

License $CSI=(AvDom)\cdot(AvInn)\cdot(PredInn)$;

where:
AvDom=½ (dominance license quartile+recent dominance license quartile);
AvInn=½ (issued innovation quartile+applied innovation quartile);
PredInn=predictive innovation quartile.

To define the license quartiles, take the range between the max and min of the respective index across the Technology Field and divide it into 4 quartiles.

For example, in the Infrared Technology Field, the maximum value for the dominance index is 1.0 while the minimum value is 0.2. Thus, the dominance license quartiles are defined as:
Quartile 1: 0.2−0.4
Quartile 2: 0.4−0.6
Quartile 3: 0.6−0.8
Quartile 4: 0.8−1.0

[Note: quartile 4 now has the highest dominance values as high dominance is essential for a license strategy.]
Cell C01 Dominance=0.484 which falls into Quartile 2; thus, dominance develop quartile=2.

The maximum value for the recent dominance index is 1.0 while the minimum value is 0.0. Thus, the recent dominance develop quartiles are defined as:

Quartile 1: 0.0–0.25
Quartile 2: 0.25–0.50
Quartile 3: 0.50–0.75
Quartile 4: 0.75–1.0

[Note: quartile 4 now has the highest dominance values calculation of the License CSI, consistent with MTFA's assumption that more dominated cells are better suited for Licensing.]

Cell C01 Recent Dominance=0.438 which falls into Quartile 2; thus, recent dominance develop quartile=2.

AvDom=½ (dominance license quartile+recent dominance license quartile)

AvDom=/2 (2+2)=2

The maximum value for the issued innovation index is 1.294 while the minimum value is −0.262 [Note: when the minimum value falls below zero, it is defaulted to zero as negative innovation has the same meaning as zero innovation]. Thus, the issued innovation quartiles are defined as:

Quartile 1: 0.0–0.323
Quartile 2: 0.323–0.647
Quartile 3: 0.647–0.970
Quartile 4: 0.970–1.294

Cell C01 Issued Innovation=0.333 which falls into Quartile 2; thus, issued innovation quartile=2.

[Note: Innovation quartiles are the same for the develop CSI and license CSI]

The maximum value for the applied innovation index is 0.869 while the minimum value is −0.143 [Note: when the minimum value falls below zero, it is defaulted to zero as negative innovation has the same meaning as zero innovation]. Thus, the applied innovation quartiles are defined as:

Quartile 1: 0.0–0.217
Quartile 2: 0.217–0.435
Quartile 3: 0.435–0.652
Quartile 4: 0.652–0.869

Cell C01 Applied Innovation=0.643 which falls into Quartile 3; thus, applied innovation quartile=3.

[Note: Innovation quartiles are the same for the develop CSI and license CSI]

AvInn=½ (issued innovation quartile+applied innovation quartile)

AvInn=½ (2+3)=2.5

The maximum value for the predictive innovation index is 0.5 while the minimum value is −0.794 [Note: when the minimum value falls below zero, it is defaulted to zero as negative innovation has the same meaning as zero innovation]. Thus, the predictive innovation quartiles are defined as:

Quartile 1: 0.0–125
Quartile 2: 0.125–0250
Quartile 3: 0.250–0.375
Quartile 4: 0.375–0.5

Cell C01 Predictive Innovation=0.310 which falls into Quartile 3; thus, predictive innovation quartile=3.

[Note: Innovation quartiles are the same for the develop CSI and license CSI]

PredInn=3

Using the calculations from above,
License CSI=(AvDom)·(AvInn)·(PredInn);
for Cell C01, License CSI=2·2.5·3=15.0

Example 2

Assignee Cell Index=ACI
For Company A in Cell C01, ACI=198.239
This ACI score is calculated below.

$$ACI = \tfrac{1}{2}\{AvPCPinCell + AvPCRPinCell\} \cdot [(ACIsI + 100) + (ACAppI + 100)]/200 \cdot 1000$$

$$ACI = 198.239 = \tfrac{1}{2}\{0.145 + 0.025\} \times [(-0.095 + 100) + (0.761 + 100)]/200 \times 1000$$

where:
AvPCPinCell=Percentage of Patents in a Cell held by an Assignee
AvPCRPinCell=Percentage of Recent Patents in a Cell held by an Assignee)

and where:
Percentage of Patents in a Cell held by an Assignee=(An Assignee's Patents in a Cell/Total Patents in a Cell)
AvPCPinCell=0.145=9/62
9=Company A's Patents in Cell C01
62=Total Patents in Cell C01
Percentage of Recent Patents in a Cell held by an Assignee=(An Assignee's Recent Patents in a Cell/Total Recent Patents in a Cell)
AvPCRPinCell=0.025=4/16
4=Company A's Recent Patents in Cell C01
16=Total Recent Patents in Cell C01 and where:
ACIsI=Assignee Cell Issued Innovation
ACAppI=Assignee Cell Applied Innovation where:
Assignee Cell Issued Innovation and Assignee Cell Applied Innovation are for each Assignee (using ACIsI when calculating for issued patents and ACAppI when calculating for applied patents):

$$ACAppI = (1/21)\{[A-B]/B \cdot 6 + [B-C]/C \cdot 5 + [C-D]/D \cdot 4 + [D-E]/E \cdot 3 + [E-F]/F \cdot 2 + [F-G]/G \cdot 1\}$$

$$ACAppI = -0.095 = (1/21)\{[0-0]/0 \times 6 + [0-0]/0 \times 5 + [0-1]/1 \times 4 + [1-1]/1 \times 3 + [1-0]/0 \times 2 + [0-0]/0 \times 1\}$$

[Note: when the denominator is zero, the zero is defaulted to 1 to make the calculation possible. For example, from above, (E−F)/F is (1−0)/0, but we default it to be (1−0)/1.]

where, for Company A:
A=0; the number of patents issued within one year of the last patent issued in the data set; B=0; the number of patents issued more than one year but less than two years prior to the issuing of last patent in the data set; C=0; the number of patents issued more than two years but less than three years prior to the issuing of last patent in the data set; D=1; the number of patents issued more than three years but less than four years prior to the issuing of last patent in the data set; E=1; the number of patents issued more than four years but less than five years prior to the issuing of last patent in the data set; F=0; the number of patents issued more than five years but less than six years prior to the issuing of last patent in the data set; G=0; the number of patents issued more than six years but less than seven years prior to the issuing of last patent in the data set.

$$ACIsI=(1/21)\{[A-B]/B\cdot 6+[B-C]/C\cdot 5+[C-D]/D\cdot 4+[D-E]/E\cdot 3+[E-F]/F\cdot 2+[F-G]/G\cdot 1\}$$

$$ACIsI=0.761=(1/21)\{[3-1]/1\times 6+[1-0]/0\times 5+[0-1]/1\times 4+[1-0]/0\times 3+[0-0]/0\times 2+[0-0]/0\}$$

[Note: when the denominator is zero, the zero is defaulted to 1 to make the calculation possible. For example, from above, (B−C)/C is (1−0)/0, but we default it to be (1−0)1.]

where, for Company A:
A=3; the number of patents applied within one year of the last patent issued in the data set; B=1; the number of patents applied more than one year but less than two years prior to the issuing of last patent in the data set; C=0; the number of patents applied more than two years but less than three years prior to the issuing of last patent in the data set; D=1; the number of patents applied more than three years but less than four years prior to the issuing of last patent in the data set; E=0; the number of patents applied more than four years but less than five years prior to the issuing of last patent in the data set; F=0; the number of patents applied more than five years but less than six years prior to the issuing of last patent in the data set; G=0; the number of patents applied more than six years but less than six years prior to the issuing of last patent in the data set.

Example 3

Detailed Illustration of the Calculation of the Assignee Field Index

Company A has an AFI=2023.193 across all cells in the Technology Field. This AFI score is calculated below.

$$AFI=H\cdot PerCentAHP\cdot Aver.$$

$$AFI=2023.193=1.45\times 0.75\times 1860.408$$

where:
H=½ [(An Assignee's Hits/An Assignee's Patents)+(An Assignee's Recent Hits/An Assignee's Recent Patents)]
H=1.45=½ [(18/12)+(7/5)]
18=Company A's Hits
12=Company A's Patents
7=Company A's Recent Hits
5=Company A's Recent Patents
PerCentAHP=Percentage of Cells where the Assignee Holds at least one Patent
=(Number of Cells where an Assignee Holds at least one Patent)/(Total Number of Cells in the Technology Field)
PerCentAHP=0.75=3/4
3=Number of Cells where Company A Holds at least one Patent
4=Total Number of Cells in the Technology Field
Aver.=Average (ACI×CSI) across the Technology Field
=(Sum of each (ACI for the given Assignee in each cell in the Technology Field ×CSI of the respective cell))/(Total Number of Cells in the Technology Field)
Aver.=1860.408=(15×198.239)+(9×277.7)+(5.25×375)/4

The ACI's for the given Assignee in each cell in the Technology Field and the CSI of their respective cells are found in the table below:

| Cells | C01 | C02 | C03 | C04 |
|---|---|---|---|---|
| CSI | 15 | 9 | 2.5 | 5.25 |
| ACI for Company A | 198.239 | 277.7 | 0 | 375 |

Example 4

MTFA Applied by Company A to Aid Pipeline Management

Company A must make decisions about investment of limited funding in multiple pipeline options, such as, new development programs, basic research programs, start-up company investing, and product line maintenance. MTFA provides an objective prioritization based on trends in patent activity and concentration through the development of a Landscape and the Cell Selection Index (CSI) for the Landscape. By applying CSI results Company A can reduce the cycle time for the decision making process by objectively prioritizing or eliminating options based on competitive and strategic information provided by the CSI component of MTFA where the option is represented by a cell in a landscape that is defined by, for example, a technology and application.

Further screening of which options Company A should pursue with respect to the Pipeline options can be aided by MTFA by reviewing Company A's competitive position relative to others in each of the selected cells representing options. Specifically, a company's decision may be impacted by knowledge of the position of one or more key competitors. MTFA provides these insights through the Assignee Cell Index which, takes into account the dominance and innovation of a given competitor in a cell and allows comparison to Company A and others.

An additional feature of MTFA can provide specific insight into potential transactions that could provide Company A a jumpstart in developing a pipeline component through a transaction. Specifically, the AFI, which identifies Companies based on innovation, dominance and breadth, can identify smaller companies, who have limited but competitive patent holdings, and may have been missed if assignees were reviewed by patent count alone. The AFI could also be applied to a cluster of cells in the landscape, selected based on higher ACI scores, to identify assignees with competitive positions in the selected subset of the overall landscape.

Example 5

Merger and Acquisition IP Integration and Risk Assessment

Figure 19:
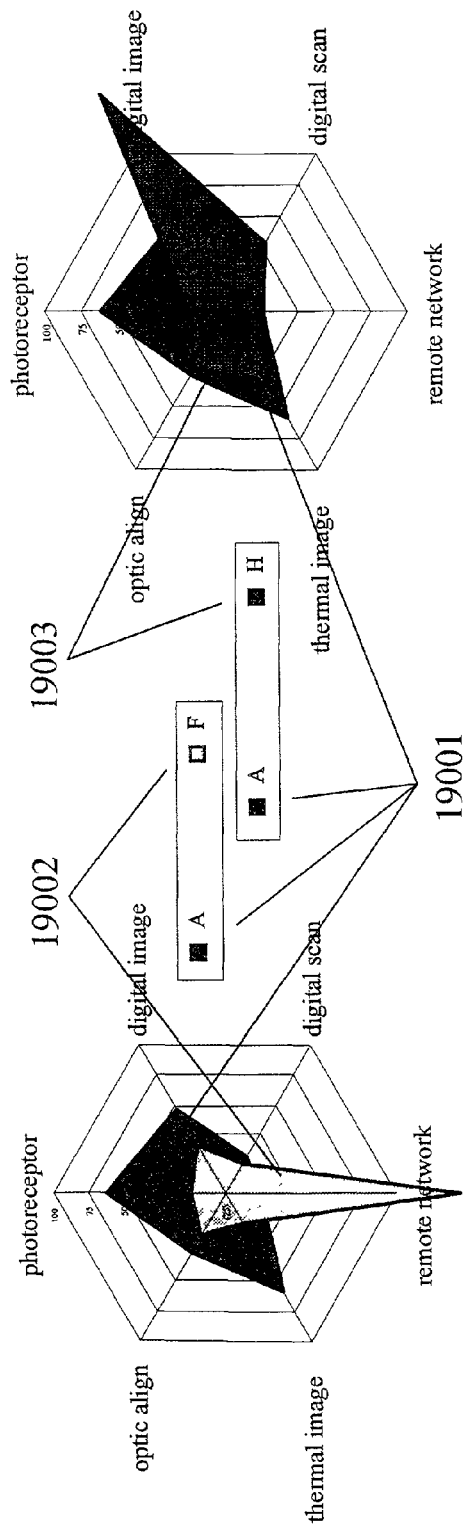
FIG. 19 shows spider graphs which may be used in strategic analysis if a company wished to choose a partner for a joint venture in a technology sector requiring strength first, in thermal imaging and remote networks, e.g., remote thermal sensors detecting automobile traffic, and second, a different joint venture requiring strength in thermal imaging and digital imaging, e.g., a satellite remote sensing of temperatures.

Mergers and Acquisitions between technology based companies, Companies A and B, require an assessment of the technology integration and intellectual property risks related to the transaction. MTFA can reduce cycle time in such activities by providing an objective measure of the contribution of Company A and Company B in a transaction through the ACI, AFI, and ACS calculations. These calculations can be applied, in the context of the technology and the transaction, in order to better understand the competitive landscape and reduce intellectual property risks associated with a transaction. For example:

An ACS examines an assignees' position in a cell in the context of their investment in the cell, overall strength (as defined by breadth) and the suitability of a given cell for a transaction. For example FIGS. 20A, 20B, and 20C illustrate a comparison of the competitive position and the alternatives each company provides as an alliance partner. FIG. 19 contrasts the overlap in patent position for Company A with two potential partners, Companies F and H.

An ACI for potential partners provides an analysis on each party's position within cells individually or within multiple cells within a landscape. The ACI is best applied to determining the relative dominance of the parties and their recent innovation, which combined provided insight into the relative competitive opportunities each party will individually contribute to an alliance in the context of all other assignees in the selected cells. Similar plots as illustrated in FIGS. 19, 20A, 20B and 20C may be prepared with ACI values replacing the ACS values.

An AFI can be derived on clusters of two or more cells within a landscape that has been prepared related to a transaction. The AFI calculation is warranted when multiple cells, which may be closely related to one another (e.g., either by indices derived, application type or technology type), should be compared to determine the fitness of potential partners across aspects of the analysis. There is value in comparing a company's AFI to their patent count as illustrated in FIG. 21.

In addition to providing a competitive comparison between parties, MTFA can provide insight into individual development programs that have greater potential competitive value and identify key inventors who should make up joint teams to facilitate integration of key projects. Similarly, to finding naturally linked clusters of cells, we can look to the individual patents and their inventors that establish those clusters. Where the two potential partners have inventor teams that cross over the same areas, we find parallel work where a joint team may bring greater competitive value through merged resources.

Example 6

MTFA Analysis for Identification of Infringement and Enforcement Analysis

Company A has a line of general-purpose resins used for making sheet material for advertising signage. The suppliers to this market are numerous and typically differentiated into broad lines of plastics, raw materials, and additives. The methods for making sheet typically involved melt-mix extrusion with various colorants. Exterior weathering and exposure to ultraviolet radiation typically rendered the installed signage unattractive after 18-24 months due to degradation of the colorant. Most stabilizing additives were incompatible with the sheet resin until A discovered a polymer-modified stabilizer that could be easily blended into the melt-mix. Four years of outdoor exposure had proven that the new stabilizer extended the service life of fabricated signage by 300%. A had filed several patents on the various compositions of the polymer-modified stabilizer and a number of process and application patents. A had actually captured significant new share in its local market and had negotiated licenses with 2 other competitors at a fair royalty for use of its patents and know-how covering the stabilizer. Curiously, A had recognized that it was experiencing a pattern of lost contracts in a certain geographic markets to competitors, some of which were unidentified.

Company A wanted to discover if certain competitors, to whom recent contracts had been lost, were possibly infringing its patents. Traditionally, Company A would attempt to acquire the products of its competitors and subject them to analysis for it's proprietary polymer-modified stabilizer, but this was going to be expensive, time consuming, and possibly publicly and pre-maturely assertive. Company A applied MTFA to its enforcement issue by crafting a nominal landscape of the field of polymer-modified colorant stabilizers and colored signage sheet applications. CSI metrics of the field suggested that several solutions to color stabilization exist, but only one other solution to color stabilization with similar performance attributes other than A's had been patented, and it involved using a film overlay. A also discovered using AFI metrics, that 4 companies had published either patents or journal articles that contained similar attributes to its own patents, 2 of which were unknown to A as competitors. A's IP legal counsel advised sending notices of A's patents to 4 competitors and attempting to acquire samples of their commercial sheet for testing.

Example 7

MTFA Analysis for Evaluating Responses to Regulatory Environment Changes

Company A operates a process using a key raw material that continues to receive examination and questioning from government safety and health authorities. Discussions, public disclosures, and trends suggest that the key raw material will become regulated in the future in such a way as to make use of the key raw material uneconomical Company A needs to identify replacements for the raw material, or modifications to their existing process to accommodate for the anticipated change and manage risk. The key question was what technical alternatives existed for replacing the key raw material?

An MTFA landscape was specified that accounted for Company A's application of the key raw material and its role in the process. The landscape also included a hypothesis that other processes using the key raw material might be sensitive the new impending regulations, and therefore attempting to find alternative themselves. Cell Selection Indices pointed to several new non-competing alternatives to A's key raw material. This discovery allowed Company A to devote R&D resources to select and plan for replacing their key material. Based on the Assignee Field Indices showing which patent holders held significant related patents in Company A's field of intended use, Company A applied legal resources to an analysis of the patents in these cells, and later determined the need for a license for its intended use from another non-competing company. Company A not only planned a technically feasible solution to an impending regulatory event, but also secured its position through a future option to an exclusive license of technology from a non-competitor at potentially lower cost.

Example 8

MTFA Provides Relevance "Altitude" and Iteration to Define Options

Strategic and tactical decisions often require an iterative process of multiple levels of information gathering in order to identify an appropriate course of action. MTFA allows for adjustment of relevance or altitude starting typically from higher altitudes and broader information and sequentially refining a Landscape to greater detail and a lower altitude. This ability to monitor and adjust altitude allows a user to take a top down approach rather than a bottom up approach, starting with general concepts, which are then broken down and focused, rather than initiating a search process by narrowing the focus to a single word or patent.

Figure 29:
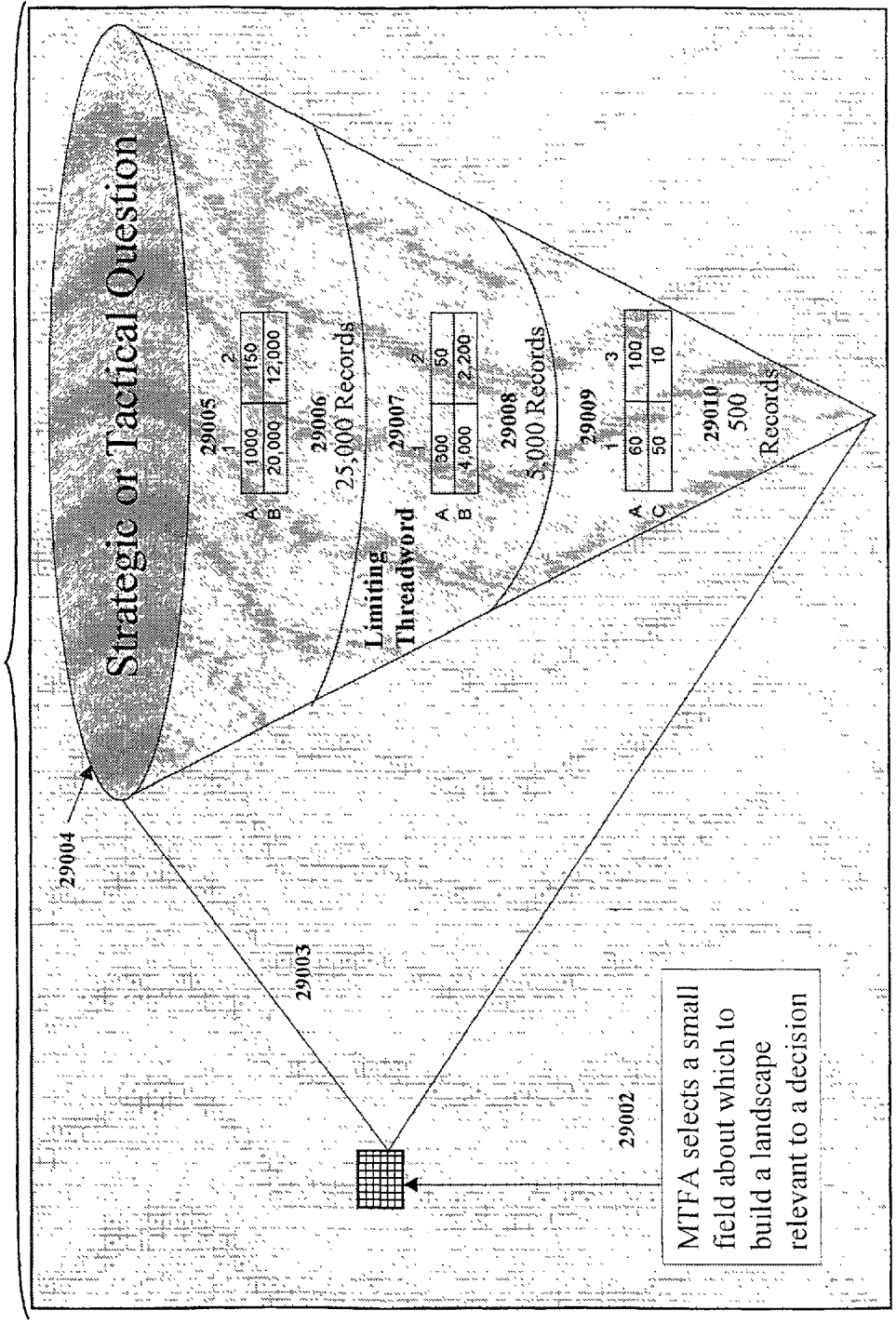
FIG. 29 shows a decreasing "altitude" as a broad landscape is progressively narrowed by feedback of narrowing threadwords.

As an example, consider FIG. 29. FIG. 29 illustrates 3 levels of "altitude" in an interactive MTFA analysis. The number of unique records in a landscape in part defines the level of focus the MTFA results provide with respect to a given decision. In this example, a broad strategic question is envisioned whereby MTFA is performed 2 times in a feedback loop where each successive iteration more narrowly defines the landscape. This is accomplished by selecting a more restrictive thread-word concept and/or by prioritizing and modifying specific cells to redefine and focus the landscape. Both examples are illustrated in FIG. 29. The initial "altitude" is 25,000 records 29006 in the A01-B02 Landscape 29005, where patent counts per cell are indicted in the landscape grid. By applying a thread-word 29007 that focuses the landscape and limits the total records to 10,000 29008, the relevance of the result is increased relative to the decision or question considered. Further reduction in "altitude" is illustrated by modified search terms (C-03) 29009 which can be derived from review of MTFA results such as the Cell Selection Score, key assigned holdings based on the Assignee Cell Index or Assignee Composite Score, and selected key patents based on hits. Modified search terms continue to restrict the Landscape to be more closely relevant to the question.

In a different preferred embodiment, the underlying database "sea" is no longer patents and technology publications, but other information. In one embodiment, this information might be press releases and advertisements of different companies. In addition to processing multiple record types, MTFA can accommodate data within a single landscape from different sources. Examples of information, which can be processed through the metrics and calculations, discussed with limited modification to assist a user in decision making include but are not limited to:

Patent and Literature databases.
Databases of technology and patents already licensed or sold or available for license or sale.
Research activity bulletins.
Other searchable content containing information on assignment and/or date.
Databases of trade secrets and know how.
Corporate knowledge management databases.

The goal would be to determine in which direction a specific company might be moving, or in which direction it is moving relative to other companies. A matrix of cells is again formed from the types of information and indices of the cell type and the assignee-type (here, designated company). Other indices analogous to the patent/published technology are applied to the data set. By combining multiple information types into a single MTFA Landscape new insights can be derived regarding the relationships between information available which may related to a companies' given question.

In another embodiment, the data might be economic data of a specified type or types, and again various analogous indices are applied to a matrix of cells based on at least two axes of information. Where there are more than two axes desired, the matrices become n-dimensional and may have a tensor representation. Presentation of data may become more complex. However, various projections of 4-dimensional, and higher, cubes onto two dimensions are known, and may be used for the presentation of results. Additionally, two-dimensional slices of n-dimensional data can be used.

Another embodiment is the application to company internal Human Resource (HR) databases. Keyword searching of the HR data bases can be done, where, for example, looking at experience and technical qualifications of personnel already having had success on similar projects, helps to choose the right people for a project team. This approach is particularly applicable for large organizations or corporations.

When two companies are merging, then based on patents applied for and patents issued, publications in the technology literature, and internal publications, one may project what technology groups may be formed and which are needed. One may look outside an organization and as well as inside the organization. One may utilize any searchable text documentation. Specifically, in a merger, one may apply the MTFA tool to a combination of human resources and technology data and functional needs of the organization and project which personnel to keep and which personnel may be redundant. i.e., that is, where is there overlap in the merger.

In a large existing company, one may apply an MTFA tool to help evaluate natural groupings together within the company, both existing and projected, or desirable.

One may also, using a database of suppliers, derive, from an MTFA tool application, which and how many suppliers to utilize. For example, which suppliers can supply with most of what is needed. One might examine, for example, a need supply of a cluster of chemicals. There might be a cluster of chemicals A, composed of a group of chemicals A1, A2 . . . . One might survey the Thomas Register® . . . or key off of a supplier name. One will then project which suppliers meet specific needs in price, delivery, and capacity to supply (for long term and full scale production needs.

Searches of Intellectual Property and other exchange databases, online or offline, which can be analyzed independently or in combination with other databases, such as patents can be performed and analyzed by MTFA.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-readable storage medium having computerized tool for use on a computer apparatus having input interfaces for receiving information, a memory for storing information and a user interface, configured for facilitating forward looking strategic analyses of a collection of technical documents each having a searchable text and associated bibliographic information including a source and a date, comprising computer-assisted steps:
  performing a first search to identify a subset (second collection) of documents focused on a particular field,
  identifying those documents in the subset relevant to each of "m" "actions";
  identifying those documents in the subset relevant to each of "n" "objects";

combining each of the "m" actions with each of the "n" objects to construct an "m"×"n" array of "cells", such that each of the cells is associated only with the documents in said subset that were identified as relevant both to the respective action and to the respective object;

applying at least two scoring metrics to the bibliographic data for the documents associated with each of the cells, at least one of the scoring metrics including a time weighted predictive factor; and generating a graph showing each of the applied scoring metrics for each of the array cells.

2. The computerized tool of claim 1 wherein the actions and objects include specific instances of categories selected from the group consisting essentially of products, services, production methods, production applications, technologies, technological applications, chemical compounds, chemical indications, inventors, assignees, forward citations to a key reference, backward citations to a key reference, and combinations thereof.

3. The computerized tool of claim 2 wherein the documents include both issued patents and not yet issued patent applications.

4. The computerized tool of claim 3 wherein the source information includes patent assignees.

5. The computerized tool of claim 4 wherein the date information includes a filing date.

6. The computerized tool of claim 5 wherein the date information also includes an issue date for the issued patents.

7. The computerized tool of claim 6 wherein one of the scoring metrics includes an innovation measure which takes into account changes of patent activity over time.

8. The computerized tool of claim 6 wherein one of the scoring metrics includes a recent innovation measure which takes into account recently filed patent applications.

9. The computerized tool of claim 6 wherein one of the scoring metrics includes a measure of the relative position of a particular assignee within a particular cell.

10. The computerized tool of claim 4 wherein each scoring metric is focused on a different assignee.

11. The computerized tool of claim 10 wherein the graph is a spider graph showing each assignee's score for a predetermined number of key cells overlaid over the corresponding scores for at least two other assignees.

12. The computerized tool of claim 1 wherein the graph displays a visual quantitative comparison for each scoring metric.

13. The computerized tool of claim 12 wherein some of the cells are grouped into "clusters", and a combined scoring metric is displayed for each cluster.

14. The computerized tool of claim 1 wherein the bibliographic source information includes the name of a subject person, organization, or event.

15. The computerized tool of claim 1 wherein the date bibliographic information includes a publication date.

16. The computerized tool of claim 1 wherein the time weighted predictive factor is based at least in part on a publication, creation, or issue date.

17. The computerized tool of claim 1 wherein one of the scoring metrics includes a concentration or frequency measure which takes into account distribution of the selected documents among their respective sources.

18. The computerized tool of claim 1 wherein one of the scoring metrics includes a composite measure of dominance, innovation, and predictive innovation.

19. The computerized tool of claim 1 wherein the actions and objects are crossed with a third dimension to form a three dimensional matrix.

20. The computerized tool of claim 1 wherein the graph is a bar graph which each bar showing a particular scoring metric applied to a particular cell.

* * * * *